United States Patent
Zhao et al.

(10) Patent No.: US 9,686,798 B1
(45) Date of Patent: Jun. 20, 2017

(54) SYSTEM AND METHOD FOR PROVIDING COLLISION-AVOIDED PHYSICAL DOWNLINK CONTROL CHANNEL RESOURCE ALLOCATION IN A NETWORK ENVIRONMENT

(71) Applicant: CISCO TECHNOLOGY, INC., San Jose, CA (US)

(72) Inventors: Qing Zhao, Fremont, CA (US); Kedar Durgadas Shirali, Sunnyvale, CA (US); Rohit Umesh Nabar, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

(21) Appl. No.: 14/597,036

(22) Filed: Jan. 14, 2015

(51) Int. Cl.
*H04W 72/04* (2009.01)
*H04W 72/12* (2009.01)
*H04W 72/02* (2009.01)
*H04W 72/06* (2009.01)

(52) U.S. Cl.
CPC ......... *H04W 72/06* (2013.01); *H04W 72/042* (2013.01)

(58) Field of Classification Search
CPC ........... H04W 72/042; H04W 72/0466; H04W 72/06; H04W 72/1257; H04W 72/1289; H04W 72/04
See application file for complete search history.

(56) References Cited

U.S. PATENT DOCUMENTS

| | | | |
|---|---|---|---|
| 6,483,820 B1 | 11/2002 | Davidson et al. | |
| 7,379,739 B2 | 5/2008 | Rajkotia et al. | |
| 7,983,667 B2 | 7/2011 | Hart et al. | |
| 8,107,950 B2 | 1/2012 | Amerijoo et al. | |
| 8,320,965 B2 | 11/2012 | Kwun | |
| 8,326,341 B2 * | 12/2012 | Hugi | H04L 5/0023 455/422.1 |
| 8,340,711 B1 | 12/2012 | Glass et al. | |

(Continued)

FOREIGN PATENT DOCUMENTS

| | | |
|---|---|---|
| CN | 102378288 | 3/2012 |
| CN | 105050072 A | 11/2015 |

(Continued)

OTHER PUBLICATIONS

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

(Continued)

*Primary Examiner* — Wutchung Chu
(74) *Attorney, Agent, or Firm* — Patent Capital Group

(57) ABSTRACT

A method is provided in one example embodiment and may include ranking a plurality of downlink control information (DCI) messages according to a first rank criterion; ranking a plurality of allowable resource sets for each ranked DCI message according to a second rank criterion; and allocating resources for each ranked DCI message based, at least in part, on whether particular resources, which are to be allocated for a particular ranked DCI message, are collided, at least in part, with previously allocated resources for one or more other DCI messages.

20 Claims, 8 Drawing Sheets

(56) References Cited

U.S. PATENT DOCUMENTS

| | | | |
|---|---|---|---|
| 8,483,149 B2 * | 7/2013 | Tiirola | H04L 5/0053 370/329 |
| 8,588,698 B2 | 11/2013 | Brisebois | |
| 8,611,299 B2 | 12/2013 | Yang et al. | |
| 8,639,243 B2 | 1/2014 | Radulescu et al. | |
| 8,712,459 B2 | 4/2014 | Lim et al. | |
| 8,792,886 B2 | 7/2014 | Meshkati | |
| 8,804,641 B2 * | 8/2014 | Yuan | H04L 5/0053 370/329 |
| 8,824,387 B2 * | 9/2014 | Chen | H04L 5/001 370/329 |
| 8,830,936 B2 * | 9/2014 | Ren | H04L 5/0053 370/252 |
| 8,842,585 B2 * | 9/2014 | Suzuki | H04W 72/042 370/278 |
| 8,917,658 B2 | 12/2014 | Bjork | |
| 8,923,201 B2 * | 12/2014 | Papasakellariou | H04W 72/042 370/328 |
| 8,958,366 B2 * | 2/2015 | Heo | H04L 5/001 370/252 |
| 8,965,294 B2 * | 2/2015 | Seo | H04J 11/005 455/437 |
| 9,112,530 B2 * | 8/2015 | Gunnam | H03M 13/1177 |
| 9,219,816 B2 | 12/2015 | Grayson et al. | |
| 9,226,255 B2 | 12/2015 | Grayson et al. | |
| 9,300,448 B2 * | 3/2016 | Gao | H04W 72/1263 |
| 9,350,737 B2 | 5/2016 | Fernandez Alonso | |
| 2005/0036462 A1 | 2/2005 | Sillasto et al. | |
| 2006/0229087 A1 | 10/2006 | Davis et al. | |
| 2007/0008885 A1 | 1/2007 | Bonner | |
| 2009/0137246 A1 | 5/2009 | Xing | |
| 2009/0305684 A1 | 12/2009 | Jones | |
| 2010/0056184 A1 | 3/2010 | Vakil | |
| 2010/0112982 A1 | 5/2010 | Singh et al. | |
| 2010/0124929 A1 | 5/2010 | Lee | |
| 2010/0135237 A1 * | 6/2010 | Papasakellariou | H04L 5/0007 370/329 |
| 2010/0157922 A1 * | 6/2010 | Kim | H04L 5/0094 370/329 |
| 2010/0182955 A1 | 7/2010 | Bjork | |
| 2010/0240314 A1 | 9/2010 | Chang | |
| 2010/0260036 A1 | 10/2010 | Molnar et al. | |
| 2010/0260068 A1 | 10/2010 | Bhatt et al. | |
| 2010/0279628 A1 | 11/2010 | Love et al. | |
| 2011/0110316 A1 | 5/2011 | Chen et al. | |
| 2011/0128913 A1 | 6/2011 | Chowdhury | |
| 2011/0130144 A1 | 6/2011 | Schein | |
| 2011/0170481 A1 | 7/2011 | Gomes | |
| 2011/0177817 A1 | 7/2011 | Hole | |
| 2011/0201333 A1 * | 8/2011 | Kwon | H04L 5/0091 455/434 |
| 2011/0211514 A1 | 9/2011 | Hamalainin | |
| 2011/0237283 A1 | 9/2011 | Shan et al. | |
| 2011/0267967 A1 * | 11/2011 | Ratasuk | H04L 5/0053 370/252 |
| 2011/0314178 A1 | 12/2011 | Kanode | |
| 2012/0004003 A1 | 1/2012 | Shaheen et al. | |
| 2012/0015653 A1 | 1/2012 | Paliwal | |
| 2012/0100849 A1 | 4/2012 | Marsico | |
| 2012/0129537 A1 | 5/2012 | Liu et al. | |
| 2012/0191842 A1 | 7/2012 | Hu et al. | |
| 2012/0210003 A1 | 8/2012 | Castro | |
| 2012/0258720 A1 | 10/2012 | Tinnakornsrisphap et al. | |
| 2012/0260299 A1 | 10/2012 | Kotecha | |
| 2012/0265888 A1 | 10/2012 | Roeland et al. | |
| 2012/0269167 A1 | 10/2012 | Velev | |
| 2012/0276913 A1 | 11/2012 | Lim | |
| 2012/0290452 A1 | 11/2012 | Pancorbo Marcos | |
| 2012/0327850 A1 | 12/2012 | Wang et al. | |
| 2013/0003697 A1 | 1/2013 | Adjakple et al. | |
| 2013/0077482 A1 | 3/2013 | Krishna et al. | |
| 2013/0114484 A1 | 5/2013 | Suzuki | |
| 2013/0132570 A1 | 5/2013 | Lopez Nieto | |
| 2013/0136072 A1 | 5/2013 | Bachmann et al. | |
| 2013/0139221 A1 | 5/2013 | Gundavelli | |
| 2013/0155948 A1 | 6/2013 | Pinheiro | |
| 2013/0155954 A1 * | 6/2013 | Wang | H04W 4/005 370/328 |
| 2013/0163543 A1 | 6/2013 | Freda et al. | |
| 2013/0182680 A1 | 7/2013 | Choi et al. | |
| 2013/0210431 A1 | 8/2013 | Abe | |
| 2013/0229945 A1 | 9/2013 | Cha et al. | |
| 2013/0235759 A1 | 9/2013 | Meshkati | |
| 2013/0294356 A1 | 11/2013 | Bala et al. | |
| 2013/0308531 A1 | 11/2013 | So et al. | |
| 2013/0326001 A1 | 12/2013 | Jorgensen et al. | |
| 2013/0337769 A1 | 12/2013 | Bhatia | |
| 2013/0337821 A1 | 12/2013 | Clegg | |
| 2013/0339783 A1 | 12/2013 | Alonso et al. | |
| 2013/0343288 A1 | 12/2013 | Ratasuk et al. | |
| 2013/0343304 A1 | 12/2013 | Kaippallimalil et al. | |
| 2014/0003225 A1 | 1/2014 | Mann et al. | |
| 2014/0010086 A1 | 1/2014 | Etemad et al. | |
| 2014/0011505 A1 | 1/2014 | Liao | |
| 2014/0016629 A1 | 1/2014 | Pancorbo Marcos | |
| 2014/0078986 A1 | 3/2014 | Kaippallimalil et al. | |
| 2014/0086226 A1 | 3/2014 | Zhao et al. | |
| 2014/0094139 A1 | 4/2014 | Xu | |
| 2014/0112251 A1 | 4/2014 | Kim et al. | |
| 2014/0126453 A1 | 5/2014 | Park | |
| 2014/0146732 A1 | 5/2014 | Olufunmilola et al. | |
| 2014/0155109 A1 | 6/2014 | Vaidya et al. | |
| 2014/0177583 A1 | 6/2014 | Aso | |
| 2014/0185537 A1 * | 7/2014 | Papasakellariou | H04L 5/003 370/329 |
| 2014/0241316 A1 | 8/2014 | Okmyanskiy et al. | |
| 2014/0254367 A1 | 9/2014 | Jeong | |
| 2014/0287759 A1 | 9/2014 | Purohit | |
| 2014/0287769 A1 | 9/2014 | Taori | |
| 2014/0297888 A1 | 10/2014 | McCann | |
| 2014/0301351 A1 | 10/2014 | Gao | |
| 2014/0307589 A1 | 10/2014 | Li | |
| 2014/0321328 A1 | 10/2014 | Zuniga | |
| 2014/0328266 A1 * | 11/2014 | Yu | H04L 5/0053 370/329 |
| 2014/0342745 A1 | 11/2014 | Bhushan | |
| 2014/0378131 A1 | 12/2014 | Rui | |
| 2015/0009826 A1 | 1/2015 | Ma | |
| 2015/0044989 A1 | 2/2015 | De Foy | |
| 2015/0055588 A1 | 2/2015 | Yerramalli et al. | |
| 2015/0063101 A1 | 3/2015 | Touati | |
| 2015/0103768 A1 | 4/2015 | Chen | |
| 2015/0103772 A1 | 4/2015 | Carnero Ros | |
| 2015/0117347 A1 | 4/2015 | Iwai | |
| 2015/0146594 A1 | 5/2015 | Grayson | |
| 2015/0172471 A1 | 6/2015 | Castro | |
| 2015/0181577 A1 * | 6/2015 | Moulsley | H04L 5/0053 370/329 |
| 2015/0200760 A1 | 7/2015 | Xia | |
| 2015/0208403 A1 * | 7/2015 | Takeda | H04L 1/00 370/329 |
| 2015/0222634 A1 | 8/2015 | Ludwig | |
| 2015/0245241 A1 | 8/2015 | Posz | |
| 2015/0264652 A1 | 9/2015 | Zhang | |
| 2015/0296516 A1 | 10/2015 | Jung | |
| 2015/0365931 A1 | 12/2015 | Ng et al. | |
| 2015/0382386 A1 | 12/2015 | Castro Castro | |
| 2016/0007170 A1 | 1/2016 | Vaidya et al. | |
| 2016/0007316 A1 | 1/2016 | Vaidya et al. | |
| 2016/0007378 A1 | 1/2016 | Bertorelle | |
| 2016/0037490 A1 | 2/2016 | Pazhyannur et al. | |
| 2016/0037550 A1 | 2/2016 | Barabell | |
| 2016/0073282 A1 | 3/2016 | Speicher | |
| 2016/0073283 A1 | 3/2016 | Grayson et al. | |
| 2016/0073285 A1 | 3/2016 | Graham et al. | |
| 2016/0073328 A1 | 3/2016 | Li | |
| 2016/0094076 A1 | 3/2016 | Enomoto | |
| 2016/0099794 A1 | 4/2016 | Chendamarai Kannan et al. | |
| 2016/0105882 A1 * | 4/2016 | Park | H04B 7/024 370/329 |
| 2016/0127137 A1 | 5/2016 | Fernandez Alonso | |
| 2016/0134761 A1 | 5/2016 | Campbell et al. | |
| 2016/0135143 A1 | 5/2016 | Won et al. | |

(56) References Cited

U.S. PATENT DOCUMENTS

| | | | |
|---|---|---|---|
| 2016/0156729 | A1 | 6/2016 | Essigmann |
| 2016/0165494 | A1 | 6/2016 | Warburton et al. |
| 2016/0191631 | A1 | 6/2016 | Haraszti |
| 2016/0226669 | A1 | 8/2016 | Livanos et al. |
| 2016/0227428 | A1 | 8/2016 | Novlan et al. |
| 2016/0234706 | A1 | 8/2016 | Liu et al. |
| 2016/0234763 | A1 | 8/2016 | Um et al. |
| 2016/0242203 | A1* | 8/2016 | You ................. H04L 5/0053 |
| 2016/0262041 | A1 | 9/2016 | Ronneke |
| 2016/0295357 | A1 | 10/2016 | Grayson et al. |
| 2016/0295521 | A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

3GPP TSG-RAN WG3 #61bis, R3-081174, "Solution for interference reduction SON use case," Orange, Alcatel-Lucent, Agenda Item 10.1.1c; Kansas City, MO, USA; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1c; Sorrento, Italy, Feb. 11-15, 2008; 4 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 Version 12.7.0 Release 12)," ETSI, 650 Route des Lucioles, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," ©European Telecommunications Standards Institute 2013; Apr. 2013; 78 pages.

"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (3GPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html;

"Broadband Forum Technical Report: TR-196 Femto Access Point Service Data Model," Issue: 1, Issue Date: Apr. 2009, ©The Broadband Forum; 131 pages.

Broadband Forum, "TR-069 CPE WAN Management Protocol," Broadband Forum Technical Report, Issue: 1 Amendment 4, Issue Date: Jul. 2011, Protocol Version 1.3, ©The Broadband Forum. All Rights Reserved; 190 pages.

Broadband Forum, "TR-196 Femto Access Point Service Data Model," Broadband Forum Technical Report, Issue 2, Issue Date: Nov. 2011, ©The Broadband Forum. All Rights Reserved; 46 pages.

(56) References Cited

OTHER PUBLICATIONS

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"RADIUS," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3588, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Saad, Sawsan A., et al., "A Survey on Power Control Techniques in Femtocell Networks," Journal of Communications vol. 8, No. 12, Dec. 2013; 10 pages.
EPO Feb. 8, 2016 Extended Search Report and Written Opinion from European Application Serial No. 15183583.2.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
"3GPP TS 29.274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Adrangi, F., et al., "Chargeable User Identity," Network Working Group RFC 4372, Jan. 2006, 10 pages.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
Droms, R., "Dynamic Host Configuration Protocol," Network Working Group RFC 2131, Mar. 1997; 45 pages.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
Holbrook, H., et al., "Source-Specific-Multicast for IP," Network Working Group RFC 4607, Aug. 2006.
"Paging Channel Selection," UMTS World; first published on or about Jun. 22, 2003; 3 pages http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS 23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29.272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TR 23.705 V0.11.0 (May 2014) Technical Report: 3rd Generation Partnership Project; Technical Specification Group Ser-

(56) References Cited

OTHER PUBLICATIONS vices and System Aspects; Study on system enhancements for user plane congestion management (Release 13)," 3GPP, 650 Route des Lucioles, F-06921, Sophia Antipolis Cedex—France, May 2014, 64 pages.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex—France, Mar. 2011; See Section 4-6, pp. 14-116.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

EPO Jan. 29, 2016 Extended Search Report and Written Opinion from European Application Serial. No. 15180616.

Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.

"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.

SA-WG2 Meeting #92, S2-123194 (Revision of Sw-122735), Juniper Networks, Barcelona, Spain, Jul. 9-13, 2012; 13 pages.

EPO Mar. 11, 2016 Extended Search Report and Written Opinion from European Application Serial No. 15193713.

"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.

PCT Apr. 6, 2016 International Search Report and Written Opinion of the International Searching Authority from International Application No. PCT/US2016/013931.

"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.

PCT Apr. 6, 2016 International Search Report and Written Opinion of the International Searching Authority from International Application No. PCT/US2016/013934.

3GPP TSG-CT WG3 Meeting #80, C3-150092, 29.213 CR0593, 3GPP Draft; Current Version 13.0.0; Huawei, et al.; Sorrento, Italy Feb. 2-6, 2015.

EPO Apr. 28, 2016 Extended Search Report and Written Opinion from European Application Serial No. 15195895.

EPO Jun. 7, 2016 Extended Search Report and Written Opinion from European Application Serial No. 16150351.

"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.

U.S. Appl. No. 14/534,792, filed Nov. 6, 2014, entitled "System and Method for Providing Message Delivery and Paging to a Group of Users in a Network Environment," Inventors: Maulik Vijay Vaidya, et al.

U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.

U.S. Appl. No. 14/480,284, filed Sep. 8, 2014, entitled "System and Method for Internet Protocol Version-Based Multiple Access Point Name Support in a Network Environment," Inventors: Mark Grayson, et al.

U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.

U.S. Appl. No. 14/536,642, filed Nov. 9, 2014, entitled "System and Method for Radio Aware Traffic Management Based Wireless Authorization," Inventors: Ian McDowell Campbell, et al.

U.S. Appl. No. 14/534,883, filed Nov. 6, 2014, entitled "System and Method for Providing Message Delivery and Paging to a Group of Users in a Network Environment," Inventors: Maulik Vijay Vaidya, et al.

U.S. Appl. No. 14/612,794, filed Feb. 3, 2015, entitled "System and Method for Providing Collaborative Neighbor Management in a Network Environment," Inventors: Nigel Edward Warbuton, et al.

U.S. Appl. No. 14/612,827, filed Feb. 3, 2015, entitled "System and Method For and Providing Policy Charging and Rules Function Discovery in a Network Environment," Inventors: Konstantin Livanos, et al.

U.S. Appl. No. 14/614,500, filed Feb. 5, 2015, entitled "System and Method for Providing Policy Charging and Rules Function Discovery in a Network Environment," Inventors: Konstantin Livanos, et al.

"PDCCH Construction, Expert Opinion," posted by Hongyan on May 20, 2011; LTE University, 4 pages; http://lteuniversity.com/get_trained/expert_opinion1/b/hongyanlei/archive/2011/05/20/pdcch-construction.aspx.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.

"PDCCH Processing," published by Gio Zakradze on Dec. 29, 2014; 56 pages.

U.S. Appl. No. 14/612,827, filed Feb. 3, 2015, entitled "System and Providing Policy Charging and Rules Function Discovery in a Network Environment," Inventors: Konstantin Livanos, et al.

* cited by examiner

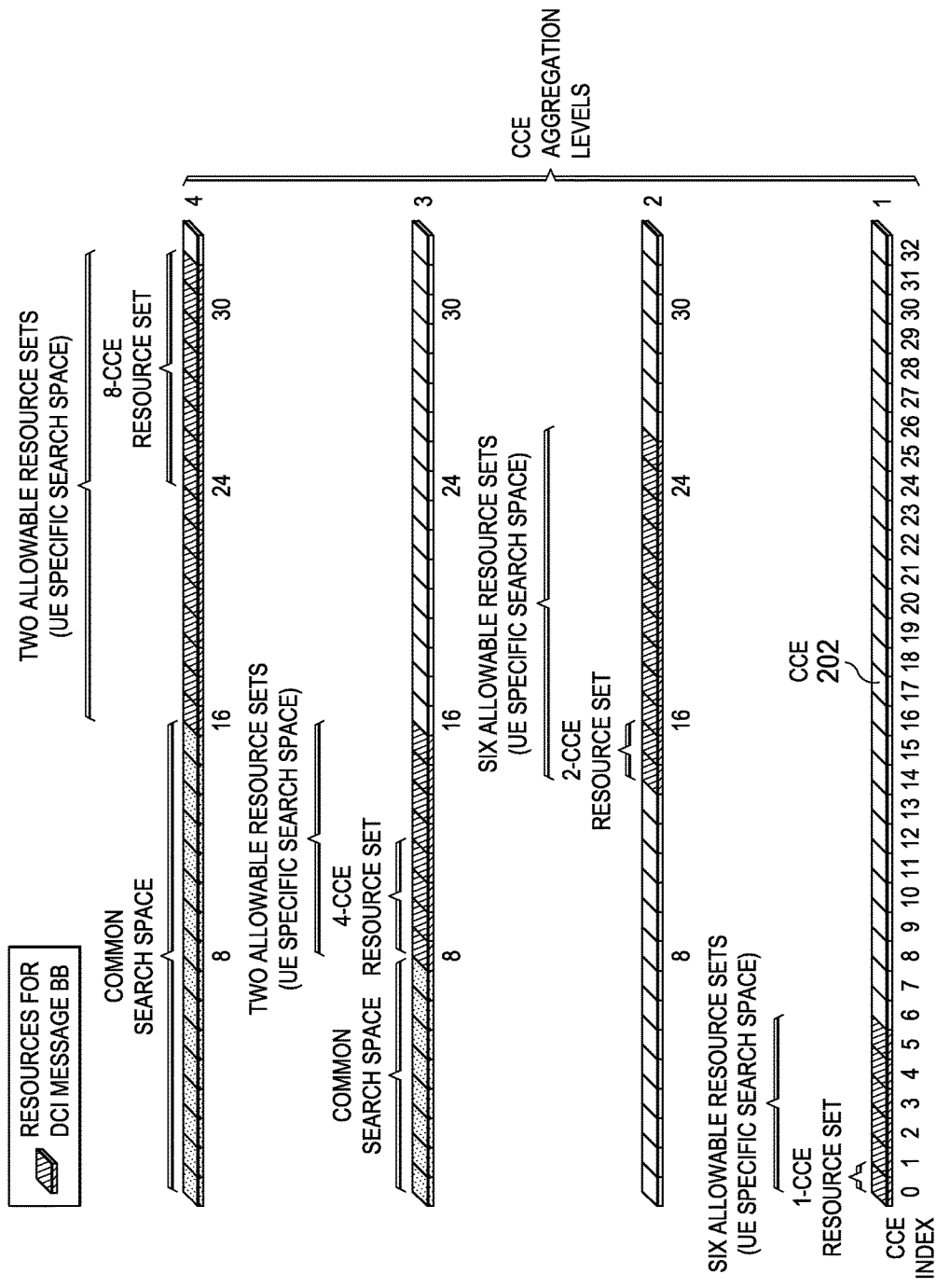

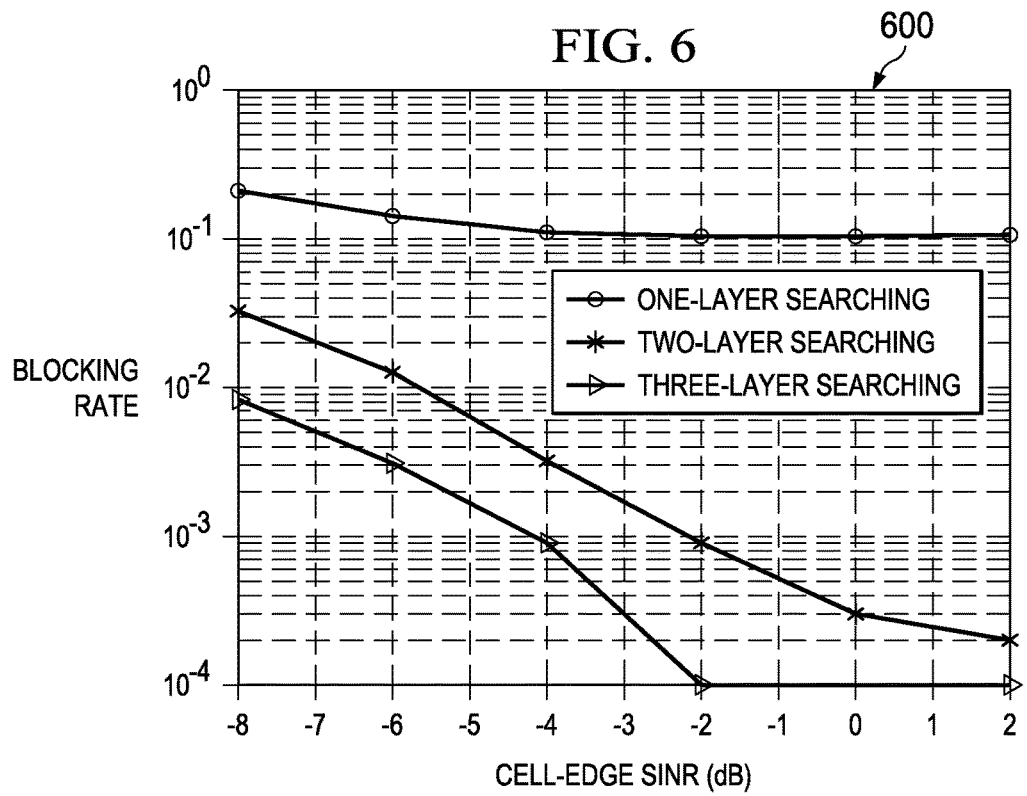
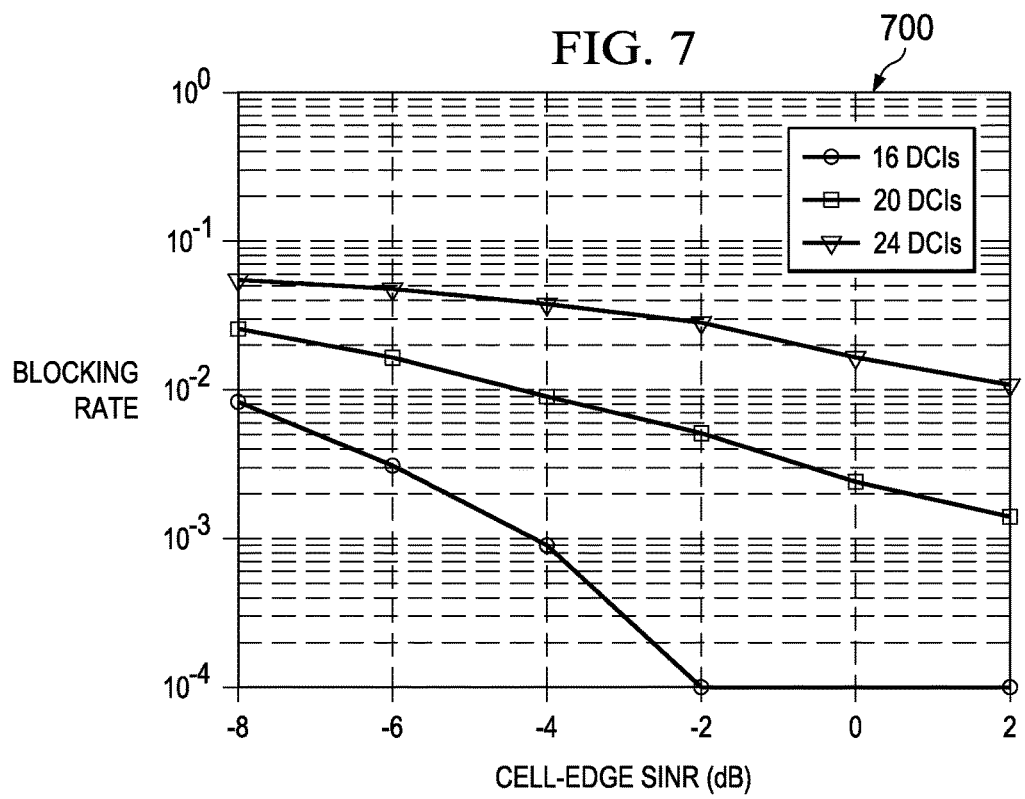

SYSTEM AND METHOD FOR PROVIDING COLLISION-AVOIDED PHYSICAL DOWNLINK CONTROL CHANNEL RESOURCE ALLOCATION IN A NETWORK ENVIRONMENT

TECHNICAL FIELD

This disclosure relates in general to the field of communications and, more particularly, to a system and method for providing collision-avoided physical downlink control channel (PDCCH) resource allocation in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, resources are allocated for a physical downlink control channel (PDCCH), which is used to communicate uplink, downlink and sometimes network related information to user equipment operating in a communication network. As the number of user equipment that are to receive such information in the PDCCH increases, the possibility of collisions or blocking of resources during resource allocation also increases, which can lead to inefficient performance for the user equipment and for the network. Accordingly, there are significant challenges in providing collision-avoided PDCCH resource allocation.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified schematic diagram illustrating example details associated with example control channel element allocations for an example downlink control information (DCI) message in accordance with one potential embodiment of the communication system;

FIG. 6 is a simulation graph illustrating example details associated with an example PDCCH resource allocation simulation using embodiments of the present disclosure; and FIG. 7 is a simulation graph illustrating other example details associated with other PDCCH resource allocation simulation using embodiments of the present disclosure.

DETAILED DESCRIPTION OF EXAMPLE EMBODIMENTS

Overview

Figure 1A:
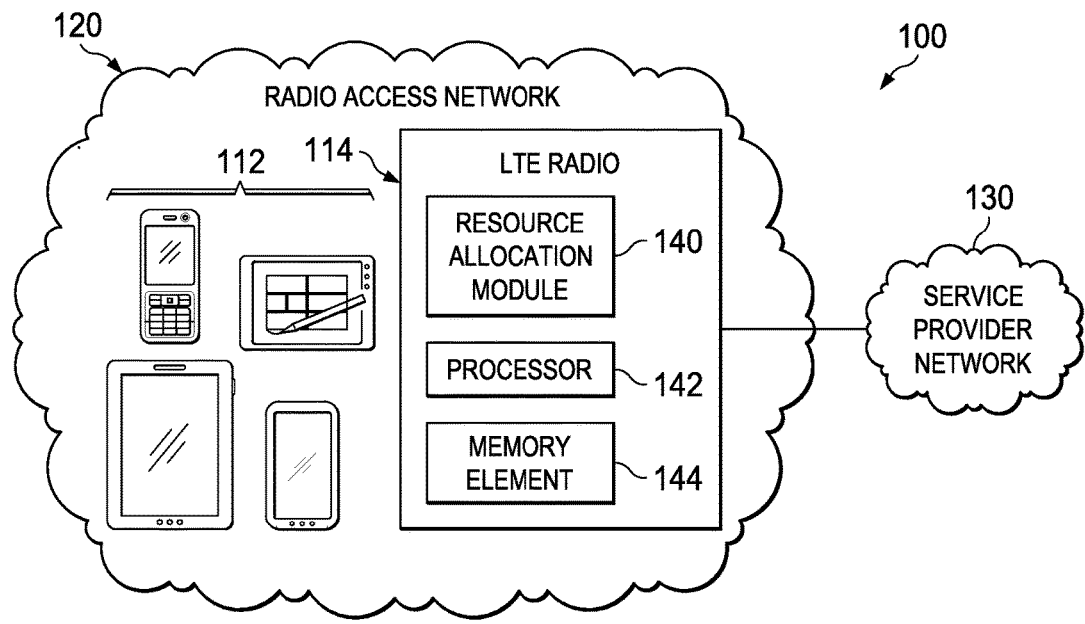
FIG. 1A is a simplified block diagram illustrating a communication system to facilitate providing collision-avoided PDCCH resource allocation in a network environment according to one embodiment of the present disclosure.

A method is provided in one example embodiment and may include ranking a plurality of downlink control information (DCI) messages according to a first rank criterion; ranking a plurality of allowable resource sets for each ranked DCI message according to a second rank criterion; and allocating resources for each ranked DCI message based, at least in part, on whether current resources, which are to be allocated for a current ranked DCI message, are collided, at least in part, with previously allocated resources for one or more other DCI messages. In some cases, the allocating can include determining whether the current resources that are to be allocated for the current ranked DCI message, are collided, at least in part, with any previously allocated resources for any of the one or more other DCI messages; and attempting to allocate the particular resources for the current ranked DCI message to a particular ranked allowable resource set that is not collided with any previously allocated resources for any of the one or more other DCI messages using a technique referred to herein in this Specification as one-layer resource set searching or, more generally, one-layer searching.

In other cases, the method can include determining that all ranked allowable resource sets for the current ranked DCI message are collided with one or more other ranked DCI messages having previously allocated resources; determining a lowest ranked allowable resource set for the current ranked DCI message that is directly collided with one or more other ranked DCI messages having previously allocated resources; and attempting to re-allocate resources for each corresponding directly collided ranked DCI message to another of its corresponding ranked allowable resource set to avoid collisions with the current ranked allowable resource set for the current ranked DCI message and with any other ranked DCI messages having previously allocated resources using a technique referred to herein as two-layer resource set searching or, more generally, two-layer searching.

In still other cases, the method can include determining that an attempted re-allocation of a directly collided DCI message causes another collision with one or more other DCI messages having previously allocated resources; and attempting to re-allocate resources for any of the one or more other corresponding ranked DCI messages to another ranked allowable resource set that is not collided with either the current resource set for the current ranked DCI message or the directly collided DCI message using a technique referred to herein as N-layer resource set searching or, more generally, N-layer searching.

In still other cases, the method can include determining that no re-allocation of any DCI message having previously allocated resources is possible without causing additional collisions; and at least one of: switching a ranking for a first two ranked allowable resource sets allowable resource sets having a same number of control channel elements (CCEs)

for a first ranked DCI message and attempting to allocate resources for each ranked DCI message to avoid collisions among the ranked DCI messages or increasing a number of symbols in a control region for a subframe in which the plurality of ranked DCI messages are to be allocated.

In some instances, the one or more other DCI messages for which resources have previously been allocated can include at least one of: one or more other ranked DCI messages; and one or more DCI messages allocated to a common search space of a physical downlink control channel (PDCCH) region of a subframe in which the plurality of ranked DCI messages are to be allocated. In some instances, the first rank criterion can include at least one of: ranking the plurality of DCI messages in descending order according to a minimum number of CCEs that each of a given DCI message is allowed to use; and for any corresponding DCI messages having a same minimum number of CCEs: ranking the corresponding DCI messages according to user equipment identities associated with the corresponding DCI messages or ranking the corresponding DCI messages randomly.

In some instances, the second rank criterion can include at least one of: ranking, for each ranked DCI message, the allowable resource sets for a particular ranked DCI message in ascending order according to a number of CCEs required in each allowable resource set for the particular ranked DCI message; and for any corresponding allowable resource sets for the particular ranked DCI message having a same number of CCEs: ranking the corresponding resource sets according to an index of a starting CCE for each corresponding allowable resource set or ranking the corresponding allowable resource sets randomly.

EXAMPLE EMBODIMENTS

Turning to FIG. 1A, FIG. 1A is a simplified block diagram illustrating a communication system 100 to facilitate providing collision-avoided PDCCH resource allocation in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally. The example architecture of FIG. 1A can include user equipment (UE) 112, an LTE radio 114, a radio access network (RAN) 120 and a service provider network 130. As shown in FIG. 1A, LTE radio 114 can include a resource allocation module 140, a processor 142 and a memory element 144.

In various embodiments, UE 112 can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112 may also be inclusive of a suitable interface to a human user such as a microphone, a display, a keyboard, or other terminal equipment.

UE 112 may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 112 may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration, default bearer activation, etc., or any suitable variation thereof.

For FIG. 1A, LTE radio 114 is generally connected to service provider network 130 and can also be connected to adjacent LTE radios. In various embodiments, LTE radio 114 can be deployed as an evolved Node B (eNodeB), which can provide cellular/mobile coverage for a macro cell network, or can be deployed as a home eNodeB, which can provide cellular/mobile coverage for a small cell network. In various embodiments, LTE radio 114 is responsible for selecting a Mobility Management Entity (MME) within service provider network 130 for session establishment for each UE 112, for managing radio resources for each UE 112, and making handover decisions for UEs, for example, handover to other LTE radios (e.g., eNodeBs and/or HeNBs). In various embodiments, LTE radio 114 may manage radio resources for each UE 112 via resource allocation module 140. As a general notion, in LTE architectures, LTE radio 114 can use a physical downlink control channel (PDCCH) to transmit downlink control information (DCI) messages from LTE radio 114 to each UE 112. Note the terms 'DCI message' and, more generally, 'DCI', can be used interchangeably herein in this Specification.

DCI messages can include critical information for downlink (DL) grant, uplink (UL) grant, power control, system configuration, random access, paging, etc. for each UE 112. A corresponding DCI message can be scheduled, via LTE radio 114, for transmission to each UE 112. DCI messages are transmitted in the control region, sometimes referred to as a PDCCH region, of each subframe for each frame of data communicated to each UE 112. When discussing a number of DCIs herein in this Specification, it should be understood that the number of DCIs corresponds in a 1:1 ratio to the number of UEs, each of which are to receive a corresponding DCI message. A DCI message can be constructed according to various DCI formats based on the type of control information to be included in the DCI message, as described in 3GPP technical specification (TS) 36.212. DCI message formats can include but not be limited to: format 0 [physical uplink shared channel (PUSCH) scheduling in one uplink (UL) cell]; format 1 [physical downlink shared channel (PDSCH) codeword scheduling in one cell]; format 1A [PDSCH codeword scheduling with random access procedure initiated by a PDCCH order]; format 1B [compact PDSCH codeword scheduling with precoding information]; format 1D [PDSCH codeword scheduling with precoding and power information]; format 2 [DCI includes: carrier indicator, resource allocation header, resource block assignment, etc.]; format 2A [similar to format 2 with different bit allocations for precoding information, etc.]; and format 2B [similar to format 2 with addition of new data indicator for single-antenna port transmission] as prescribed in TS 36.212.

Upon receiving a transmission from LTE radio 114, each UE 112 performs blind decoding on one or more UE specific search spaces of each subframe to decode a corresponding UE specific DCI message that can be included therein. For some deployments, a common search space can be included in the PDCCH (control) region that can include information which can be decoded by all UEs receiving the transmission from LTE radio 114.

RAN 120 is a communications interface between UE 112 and service provider network 130. In various embodiments, depending on deployment, one or more LTE radio(s) 114 can be deployed in RAN 120 to provide macro and/or small cell mobile/cellular coverage for UE 112. In general, small cell networks are comprised of multiple small cell access points, which can provide proximate coverage to users in an environment in which macro network coverage may be limited or interfered (e.g., within a building, structure, facility, etc.). Typically, small cell access points operate at lower radio power levels as compared to macro cell radios. Small cell access points can be connected using a standard broadband digital subscriber line (DSL), internet or cable service into service provider network 130. Calls can be made and received, where the signals are sent (potentially encrypted) from a given small cell access point via the broadband Internet protocol (IP) network to one of the service provider's main switching centers.

Thus, RAN 120 may provide one or more coverage areas for servicing multiple end users and for managing their associated connectivity. The communications interface provided by RAN 120 may allow data to be exchanged between an end user and any number of selected elements within communication system 100. For example, RAN 120 may facilitate the delivery of a request packet generated by a given UE (e.g., UE 112) and the reception of information sought by an end user. In various instances, RAN 120 may operate to provide cellular/mobile coverage for access networks, such as, for example, LTE access networks such as Evolved UTRAN (E-UTRAN), generally referred to as 4G or LTE. RAN 120 is only one example of a communications interface between an end user and service provider network 130. Other suitable types of communications interfaces may be used for any appropriate network design and, further, be based on specific communications architectures in accordance with particular needs.

Service provider network 130 represents a series of points or nodes of interconnected communication paths for receiving and transmitting packets of information that propagate through communication system 100. Service provider network 130 may offer communicative interfaces between UE 112 and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Communication system 100 may implement a user datagram protocol (UDP)/Internet protocol (UDP/IP) connection and use a transmission control protocol (TCP/IP) communication language protocol in particular embodiments of the present disclosure. However, communication network may alternatively implement any other suitable communication protocol for transmitting and receiving data packets within communication system 100.

Before detailing some of the operational aspects of FIG. 1A, it is important to understand common characteristics of PDCCH resource allocation as generally provided in commercial architectures. The following foundation is offered earnestly for teaching purposes only and, therefore should not be construed in any way to limit the broad teachings of the present disclosure. In LTE, each DCI message can be transmitted on one control channel element (CCE), two CCEs, four CCEs or eight CCEs, where each CCE contains thirty-six resource elements (REs). A resource element (RE) is the minimum resource unit in LTE, which can be provisioned control information. No matter how many CCEs are used, LTE-allowed resource locations for each DCI are not arbitrary and are actually well-specified. For example, resource locations can depend on a UE's identity (e.g., a radio network temporary identifier (RNTI)), network timing (e.g., subframe index), and the number of CCEs to be used for a given DCI message (e.g., CCE aggregation level). Thus, when allocating resources for multiple DCI messages (e.g., for multiple UEs), it is likely that allowable PDCCH resource allocations for different DCIs are overlapped.

As described in 3GPP TS 36.211, the number of CCEs available in each subframe for which resources can be allocated may vary based on the downlink bandwidth for a given cell, the number of orthogonal frequency-division multiplexing (OFDM) symbols in the control region for each subframe, the amount of resources occupied by a physical hybrid-ARQ indicator channel (PHICH) groups [typically referenced using an allocation factor 'Ng'], the number of antenna ports (not shown) available for transmission for LTE radio 114 and/or any CCEs occupied by DCIs allocated in the common search space of each subframe. For example, for a 10 MHz downlink bandwidth having three (3) symbols in each subframe control region and Ng=1/2 for PHICH, there may be 42 CCEs are available for resource allocation in the PDCCH (control) region. However, the number of available CCEs may be further reduced by the number of CCEs that may be provisioned for the common search space of each subframe. For the current example, for an 8-CCE DCI allocated in the common search space for each, the number of available CCEs for allocation may be reduced to 34.

In current deployments, when allocating a DCI for a UE, if it is found that all possible PDCCH resources for the corresponding DCI are occupied or partially occupied by other DCIs, then the corresponding DCI message is dropped and denoted as a blocked DCI message. Typically, the more DCIs to be scheduled on a subframe, the higher the chance that a DCI message will be blocked. Dropping a DCI message typically implies dropping the transmission of critical information to a given UE and has significant impacts on UE throughput and delay performance. Therefore, it is desirable to minimize DCI blocking rate when the number of DCIs scheduled in each subframe is high (e.g., greater than or equal to 16).

In accordance with various embodiments described herein, communication system 100 is configured to address these issues (and others) in offering a system and method for providing collision-avoided PDCCH resource allocation targeted towards avoiding collisions among DCI messages, which will therefore maximize PDCCH resource utilization efficiency and increase the number of UEs that can be scheduled on each subframe. In at least one embodiment, the method described herein can be executed by a hardware processor of a given LTE radio (e.g., LTE radio 114).

A DCI message can be transmitted by LTE radio 114 using one of four possible aggregation levels, each of which corresponds to using one CCE, two CCEs, four CCEs or eight CCEs. Based on channel conditions for a given UE, LTE radio 114 can select one or multiple proper aggregation levels for DCI transmission. When allowable aggregation levels are determined, a candidate pool of allowable resource sets on which a given DCI message can be allocated and transmitted to a given UE 112 can also be determined by LTE radio 114 given a UE's identity and transmission time instance. For one or more embodiments described herein, it is assumed that LTE radio 114 prepares and/or schedules DCI messages for transmissions, selects an appropriate minimum aggregation level, etc. for each UE 112 based on channel conditions, etc. although the details related to these operations are not needed to illustrate the collision-avoided PDCCH resource allocation system and method described herein.

As noted, each aggregation level can be mapped to a candidate pool of LTE-allowed resource sets, generally referred to as allowable resource sets, to which a given DCI message can be allocated. As referred to herein in this Specification, a resource set may denote a set of consecutive CCEs, wherein each resource set can be pooled into a candidate pool of allowable resource sets for a given DCI message based on the aggregation level of the DCI message. TABLE 1, shown below, illustrates a mapping of each aggregation level 1-4 to a corresponding total number of allowable resource sets for each aggregation level and a corresponding number of CCEs for each resource set of the corresponding allowable resource sets, as determined by the aggregation level.

TABLE 1

| Aggregation Level | # Allowable Resource Sets | # CCEs For Each Resource Set |
|---|---|---|
| 1 | 6 | 1 |
| 2 | 6 | 2 |
| 3 | 2 | 4 |
| 4 | 2 | 8 |

In general, upon determining allowable resource sets for each DCI scheduled to be allocated in a given subframe, LTE radio 114, via resource allocation module 140, can perform PDCCH resource allocation to select a candidate resource set for each scheduled DCI message from its resource set candidate pool. The PDCCH resource allocation for each DCI message can be performed to minimize blocking rate amongst the DCI messages that have been scheduled to be allocated for a given subframe.

During operation, for example, LTE radio 114, via resource allocation module 140, may order or rank all scheduled DCIs for PDCCH resource allocation according to a first rank criterion. In at least one embodiment, the first rank criterion can include, but not be limited to, one or more of the following: ranking DCIs in descending order of the minimum number of CCEs that a DCI is allowed to use; for DCIs with same value of minimum number of CCEs, the DCIs may be ranked according to UE identity (e.g., UE identity to which a DCI corresponds) or may be ranked randomly.

For each DCI message, LTE radio 114, via resource allocation module 140, may order or rank all allowable resource sets for each DCI message for selection according to a resource set rank criterion. In at least one embodiment, the resource set rank criterion can include, but not be limited to, one or more of the following: ranking resource sets in ascending order based on the number of CCEs required in each resource set that can be allocated for a given DCI message; for resource sets with same number of CCEs, these resource sets can be ranked according to the index of the starting CCE for each resource set or can be ranked randomly.

Recall, that the DCI ranking can be based on the minimum number of CCEs required for a given DCI message. However, the number of CCEs for the DCI message can be increased from the minimum required to include CCE sets for higher aggregation levels but cannot be decreased to include lower aggregation levels. For example, consider a given DCI message 'AA', which may be determined to have an aggregation level of two (2). Based on this aggregation level, resources for DCI message AA can be allocated, at a minimum, using any of six (6) resource sets, each consisting of 2-CCEs, but may also be allocated at aggregation level three (3) using any of 2 resource sets, each consisting of four (4) CCEs, or at aggregation level 4 using any of 2 resource sets, each consisting of eight (8) CCEs. Thus, the ranking of resource sets for DCI message AA can include ranking ten (10) possible resource sets (e.g., 6 allowable resource sets for aggregation level 2; 2 allowable resource sets for aggregation level 3; and 2 allowable resource sets for aggregation level 4). The ranking may proceed by ranking, in ascending order for example, the 2-CCE resource sets for the 6 allowable resource sets for aggregation level 2 (which can be further ranked according to starting CCE index of each resource set), followed by the 4-CCE resource sets for the 2 allowable resource sets for aggregation level 3 (which can be further ranked according to starting CCE index of each resource set), followed by the 8-CCE resource sets for aggregation level 4 (which can be further ranked according to starting CCE index of each resource set).

Following the ranking of DCI messages and the ranking of allowable resource sets for each DCI message, LTE radio 114, via resource allocation module 140, may attempt to allocate a allocate resource set for each DCI following the rank of each DCI using a process referred to herein as 'resource set searching'. For each DCI, LTE radio 114 may attempt to allocate resources for the DCI following the rank of allowable resource sets for the DCI. If a collision occurs for a current allowable resource set for a current DCI for which resource allocation is sought (e.g., a fraction of a resource set is occupied by other DC's that have been previously allocated), LTE radio 114 may attempt to allocate the resources to the next available allowable resource set for the current DCI until allocation has been attempted for all allowable resource sets for the current DCI. Resource set searching for a current DCI for which allocation is sought is generally referred to as one-layer resource set searching or, more generally, one-layer searching.

However, if a collision occurs for all allowable resource sets for a current DCI for which allocation is sought, LTE radio 114, via resource allocation module 140, can attempt to re-allocate resources to one or more DCI(s) having previously allocated resources, which may be colliding with the current DCI. Thus, LTE radio 114 can attempt to re-allocate resources to not only the current DCI message and but also other DCI messages collided to it in an attempt to avoid collisions between DCIs. For example, if no resource set is found for a current DCI message AA, then LTE radio 114 can attempt to re-allocate the resource for all other DCI messages having previously allocated resources which are collided with DCI message AA. This process of resource set searching DCI messages having previously allocated resources, which are collided with a current DCI message for which resource allocation is sought, is referred to herein as two-layer resource set searching or, more generally, two-layer searching.

If still no resource set is found for a current DCI message via the two-layer searching, LTE radio 114 can continue to re-allocate other previously allocated resources for other DCI messages which are not directly collided with DCI message AA but which are collided with DCI messages that are directly collided with the current DCI message from the two-layer searching. This process is referred to herein as three-layer resource set searching or, more generally, three-layer searching. In various embodiments, the resource searching can continue up to N-layer (e.g., searching other previously allocated DCIs that are not directly collided with a current DCI, but which are collided with DCIs for which re-allocation is sought) until a collision for a current DCI message is avoided, which is referred to herein as N-layer resource set searching or, more generally, N-layer searching. In various embodiments, the number of layers 'N' for resource set searching can be configured by a service provider, operator, equipment manufacturer, combinations thereof or the like. For ease of discussion, DCI messages having previously allocated resources that may not be directly collided with the current DCI message, but which have a collision, at least in part, with resources of a directly collided DCI message will be referred to herein in this Specification as 'indirectly collided' DCI messages.

In certain embodiments, if a collision can still not be avoided after the configured N-layer resource set searching (e.g., number of layers of resource set searching configured by a service provider, etc.), then for the top ranked DCI, LTE radio 114, via resource allocation module 140, can switch the rank of the top two resource sets having the same number of CCEs for the first (top) ranked DCI and proceed to re-allocate resources for each DCI following its rank using the resource set searching techniques described above (e.g., one-layer, two-layer, etc.). Essentially, this can provide a mechanism to rest the initial point for resource allocation and resource set searching for the ranked DCIs scheduled for transmission.

In still other embodiments, if a collision can still not be avoided after the configured N-layer resource set searching, LTE radio 114 can denote a DCI message as blocked and may drop the DCI message from being allocated for a current subframe and continue to attempt to allocate any remaining ranked DCI messages. In still other embodiments, if a collision can still not be avoided after the configured N-layer resource set searching, LTE radio 114 can increase the number of symbols for the PDCCH region and begin the PDCCH resource allocation for the ranked DCI messages.

It should be noted that the complexity of the N-layer resource set searching, as discussed for the various embodiments described herein, can be represented by the following equation: $O(n)+B1*O(n^2)+B2*O(n^3)+ \ldots +Bi*O(n^i)$; where 'Bi' is the blocking rate after each i-layer searching, 'n' is the average number of allowable resource sets for each DCI message and wherein 'O(n)' represents the complexity of the N-layer resource set searching in the order of 'n'. It has been verified through simulations that to schedule 16 DCIs for transmission, three-layer searching can provide approximately a 0.1% blocking rate, while two-layer searching can provide approximately a 1% blocking rate (which is typically sufficient in reality). Based on an assumption that the average number of allowable resource sets for each DCI message can be approximately 10 or less, the complexity of the resource set searching does not increase exponentially with the number of search layers but rather linearly increases with the number of search layers, due to an exponential reduction of blocking rate with an increase of searching layers.

Some particular embodiments described herein may provide advantages over traditional approaches to PDCCH resource allocation. For resource set searching, for example, traditional approaches only attempt to allocate resources within the allowable resource sets for a current DCI message if it is collided with other DCI messages. However, various embodiments discussed herein in this Specification provide enhanced allocation techniques, which can attempt to allocate resources within allowable resource sets for a current DCI message; can attempt to allocate resources within allowable resource sets for one or more DCI messages that are directly collided with the current DCI message; and can further attempt to allocate resources within allowable resource sets for one or more other DCI messages that are not directly collided with the current DCI message, but which are collided with the directly collided DCI messages for the current DCI.

Further, traditional approaches to PDCCH resource allocation do not rank or order DCIs prior to performing PDCCH resource allocation. Various embodiments of communication system 100, however, provide for ranking DCIs according to a DCI rank criterion, which can help to make the entire PDCCH resource region less fragmented. For example, in embodiments where the DCI rank criterion is set to rank DCIs in descending order based be based on the minimum number of CCEs required for resource allocation for each DCI, first assigning resources for DCIs requiring a larger number of CCEs can help to reduce the number of searching attempts for allocating resources for other (lower ranked) DCIs.

Moreover, traditional approaches do not provide for resetting the initial starting point of resource allocation for all DCIs scheduled for transmission if a collision occurs during resource allocation of a subsequent DCI message. Yet, certain embodiments of communication system 100 can provide for resetting the initial starting point for resource allocation for all DCIs scheduled for transmission if a collision occurs during resource allocation for a subsequent transmission by switching the rank of the top two allowable resource sets for the top ranked DCI that have the same number of CCEs.

Accordingly, various embodiments of communication system 100 may provide a system and method for PDCCH resource allocation, which targets to avoid collisions among DCI messages, and therefore maximizes PDCCH resource utilization efficiency and increases the number of UEs that can be scheduled on each subframe. In addition, using various embodiments described herein, it may be feasible to reserve less resources for PDCCH resource allocation (e.g., leaving more resources in each subframe for downlink data traffic) in order to support a same number of DCIs in each subframe at a same target blocking rate for each subframe. In particular for small cell deployments, various embodiments described herein can help to improve user experience in terms of a greater throughput and a less delay for users accessing a small cell RAN.

As shown in FIG. 1A, LTE radio 114 includes resource allocation module 140, processor 142 and memory element 144. Hence, appropriate software and/or hardware is being provisioned in LTE radio 114 in order to facilitate providing collision-avoided PDCCH resource allocation using the techniques described herein. In various embodiments, each UE 112 can also include a corresponding processor and a corresponding memory element. Note that in certain examples, certain storage can be consolidated with memory elements (or vice versa), or the storage can overlap/exist in any other suitable manner.

In one example implementation, user equipment 112 and LTE radio 114 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate and/or manage collision-avoided PDCCH resource allocation activities (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 100, each of UE 112 and LTE radio 114 can include a memory element (e.g., memory element 144 for LTE radio 114) for storing information to be used in achieving the collision-avoided PDCCH resource allocation operations, as outlined herein. Additionally, each of these devices may include a processor (e.g., processor 142 for LTE radio 114) that can execute software or an algorithm to perform the collision-avoided PDCCH resource allocation activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to user equipment 112 and/or LTE radio 114 could be provided in any database, register, control list, cache, or storage structure: all of which can be referenced at any suitable timeframe. Any such storage options may be included within the broad term 'memory element' as used herein. Similarly, any of the potential processing elements, modules, hardware and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the collision-avoided PDCCH resource allocation operations as outlined herein may be implemented by logic encoded in one or more tangible media, which may be inclusive of non-transitory media (e.g., embedded logic provided in an ASIC, in digital signal processor (DSP) instructions, software [potentially inclusive of object code and source code] to be executed by a processor, or other similar machine, etc.). In some of these instances, memory elements [as shown in FIG. 1A] can store data used for the operations described herein. This includes the memory elements being able to store software, logic, code, or processor instructions that are executed to carry out the activities described herein. A processor, including a hardware processor, can execute any type of instructions associated with the data to achieve the operations detailed herein. In one example, the processor [as shown in FIG. 1A] could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 1B:
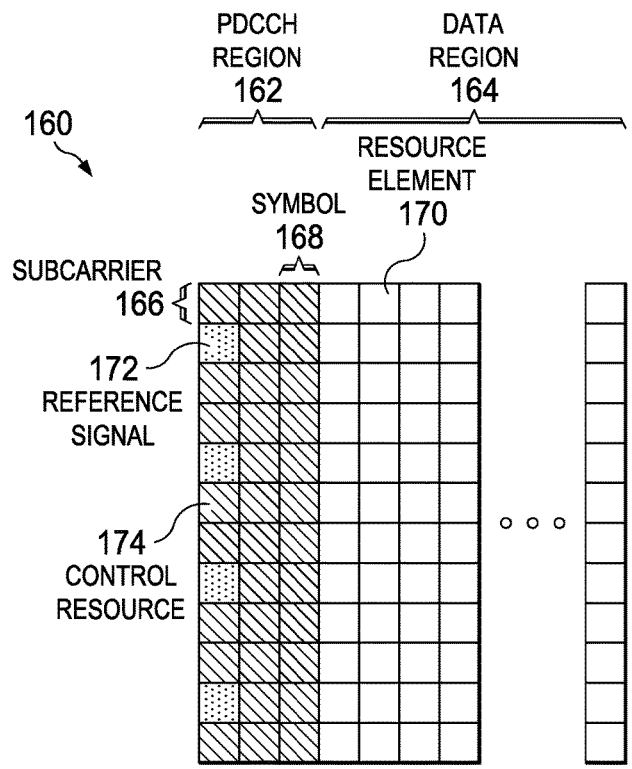
FIG. 1B is a simplified schematic diagram illustrating example details associated with an example subframe in accordance with one potential embodiment of the communication system.

Referring to FIG. 1B, FIG. 1B is a simplified schematic diagram illustrating an example subframe 160 in accordance with one potential embodiment of the communication system. Subframe 160 can include a PDCCH (control) region 162 and a data region 164. In LTE, subframe 160 typically represents a 1 millisecond (ms) transmission time interval (TTI) for a number of (OFDM) symbols 168 spread across a number of subcarriers 166. In various embodiments, the number of subcarriers 166 can depend on the transmission bandwidth for LTE radio 114. In various embodiments, the number of symbols 168 can depend on the cyclic prefix type for downlink transmissions (e.g., 12 symbols for normal cyclic prefix or 14 for symbols for extended cyclic prefix) and/or can depend on whether blocking can be performed for a current ranked DCI message needing PDCCH resource allocation (e.g., number of symbols can be increased if blocking cannot be avoided for a current ranked DCI message needing PDCCH resource allocation). As noted, the smallest unit of a subframe is a resource element, shown in FIG. 1B as resource element 170, which represents one subcarrier 166 by one symbol 168.

Figure 3:
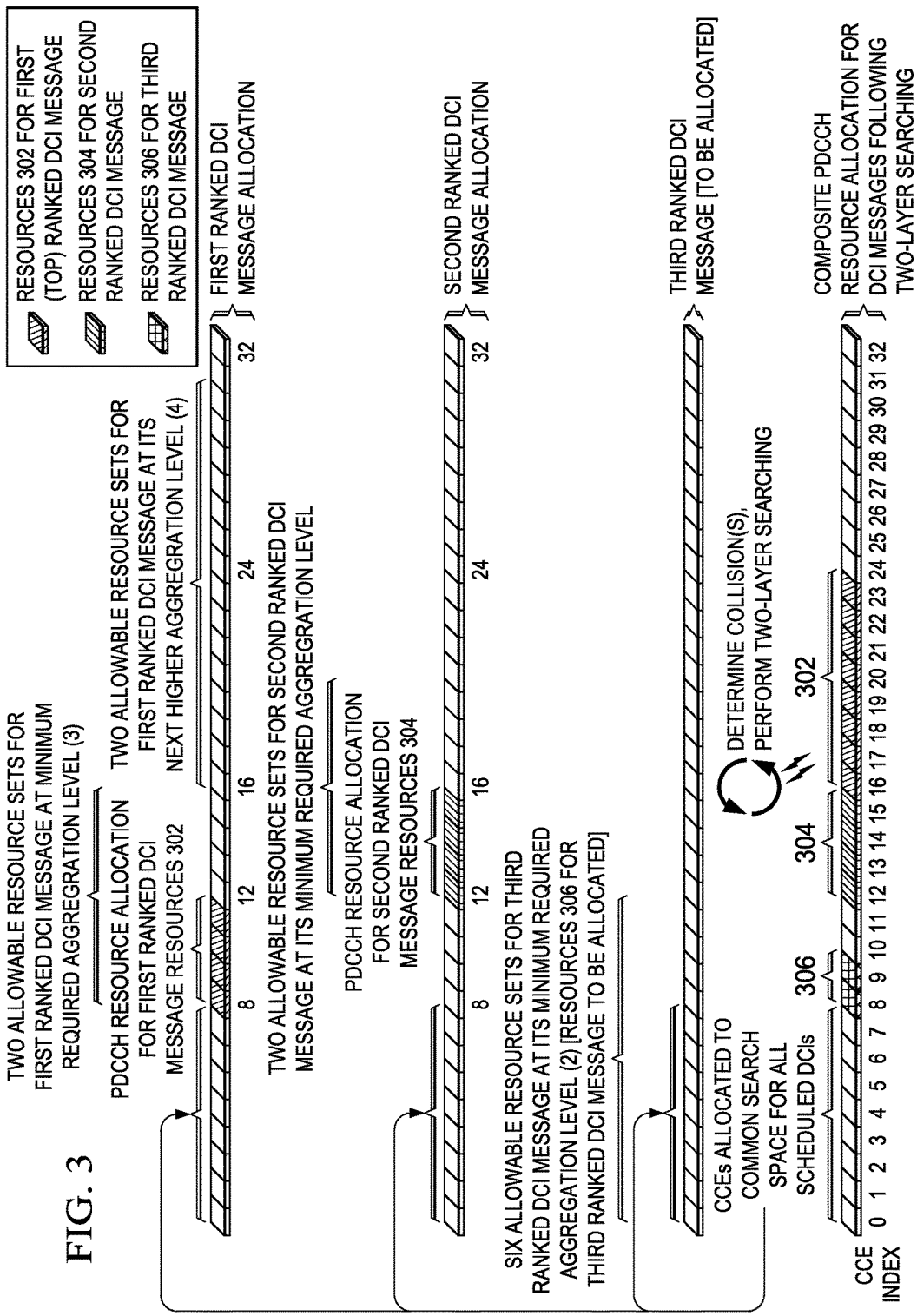
FIG. 3 is a simplified schematic diagram illustrating example details associated with providing collision-avoided PDCCH resource allocation for a number of DCI messages in accordance with one potential embodiment of the communication system.

The number of symbols 168 included in PDCCH region 162 can vary depending on channel bandwidth. PDCCH region 162 can include a number of reference signals 172 and a number of control resources 174 (e.g., DCI resources). Reference signals 172 can be spread across additional symbols of PDCCH region 162 depending on the number of transmission antenna ports for LTE radio 114, which can affect the number of control resources 174 allocated in PDCCH region 162. Recall, each CCE can include 36 resource elements for PDCCH resource allocation. Various example details associated with CCEs are illustrated in FIGS. 2 and 3, discussed below.

Referring to FIG. 2, FIG. 2 is a simplified schematic diagram illustrating example details associated with allocations of a number of CCEs 202 for different aggregation levels of an example DCI message 'BB' in accordance with one potential embodiment of communication system 100. As shown in FIG. 2, resources for DCI message BB can be allocated according to various aggregation levels 1-4. Each aggregation level includes a number of allowable resource sets for a corresponding UE specific search space for a given UE (e.g., a given UE 112), which can be determined, at least in part, by the UEs identity. Each UE specific search space represents a number of CCEs, which can be blind decoded by a given UE to process a DCI message. Aggregation levels 3 and 4 can additionally include a common search space, which can include common control information that can be decoded by all UEs receiving transmissions from a given LTE radio (e.g., LTE radio 114). For example, aggregation level 3 can include an 8-CCE common search space and aggregation level 4 can include two 8-CCE common search spaces.

It should be noted that the number of CCEs 202 shown in FIG. 2 for each aggregation level is provided for illustrative purposes only and is not meant to limit the broad scope of the present disclosure. As noted previously, the number of CCEs available in each subframe for which resources can be allocated can vary based on the downlink bandwidth for a given cell, the number of OFDM symbols in the control region for each subframe, the amount of resources occupied by PHICH groups, the number of antenna ports available for transmission for LTE radio 114 and/or any CCEs occupied by DC's allocated the common search space of each subframe.

As shown in FIG. 2, CCE aggregation level 1 includes six allowable resource sets, each of which comprises 1-CCE resource set for a UE specific search space. A first 1-CCE resource set can begin at CCE index 0, a second (1-CCE resource set) can begin at CCE index 1, a third can begin at CCE index 2, a fourth can begin at CCE index 3, a fifth can begin at CCE index 4, and a sixth can begin at CCE index 5. It should be noted that the starting CCE index for each aggregation level should satisfy modulo indexing guideline, which stipulates that the modulus of the starting index for a given CCE aggregation level divided by the number of CCEs required for the aggregation level (e.g., 1, 2, 4, 8) be equal to zero. For example, aggregation level 2 requires 2-CCE resources sets; thus, the starting CCE index for PDCCH resource allocation for resources allocated for aggregation level 2 should be evenly divisible by two (e.g., CCE index 0, 2, 4, 6, etc., for example).

CCE aggregation level 2 includes six allowable resource sets, each of which comprises a 2-CCE resource set for a UE specific search space. A first 2-CCE resource set can begin at CCE index 14, a second (2-CCE resource set) can begin at CCE index 16, a third can begin at CCE index 18, a fourth can begin at CCE index 20, a fifth can be begin at CCE index 22 and a sixth can begin at CCE index 22.

CCE aggregation level 3 includes two allowable resource sets, each of which comprises a 4-CCE resource set for a UE specific search space. A first 4-CCE resource set can begin at CCE index 8 and a second 4-CCE resource set can begin at CCE index 12. CCE aggregation level 4 includes two allowable resource sets, each of which comprises an 8-CCE resource set for a UE specific search space. A first 8-CCE resource set can begin at CCE index 16 and a second 8-CCE resource set can begin at CCE index 24. Thus, as shown in FIG. 2, resources for DCI message BB can be allocated to a number of CCEs depending on the minimum required aggregation level for the DCI message. Recall, however, that resources for DCI messages can also be allocated to aggregation levels higher than their minimum required aggregation level. This feature of PDCCH resource allocation can be used by communication system 100 to help avoid collisions between DCI messages as discussed in further detail in FIG. 3.

Turning to FIG. 3, FIG. 3 is a simplified schematic diagram illustrating example details associated with providing collision-avoided PDCCH resource allocation for a number of DCI messages in accordance with one potential embodiment of communication system 100. In particular, FIG. 3 illustrates an embodiment of two-layer searching for collision-avoided PDCCH resource allocation that can be provided by communication system 100. In general, the example details shown in FIG. 3 illustrate that PDCCH resource allocation for a third ranked DCI message is needed following previous PDCCH resource allocations for a first (top) ranked DCI message and a second ranked DCI message. A possible composite PDCCH resource allocation for all three DCI messages is shown following two-layer searching, which can be performed by LTE radio 114, via resource allocation module 140. FIG. 3 includes resources 302 for the first (top) ranked DCI message; resources 304 for the second ranked DCI message and resources 306 for the third ranked DCI message. [Note resources 302, 304 and 306 are meant to represent the first ranked DCI message, the second ranked DCI message and the third ranked DCI messages, respectively].

FIG. 3 includes various allocations of resources for various DCI messages scheduled for transmission. In a certain embodiment, it is assumed for FIG. 3 that the DCI messages have been ranked in descending according to the minimum number of CCEs required for PDCCH allocation for each DCI, with DC's having a same minimum number of CCEs ranked according to UE identity (e.g., the UE to receive the corresponding DCI message). Further, it is assumed in a certain embodiment that the allowable resource sets for each DCI message have been ranked in ascending order based on the number of CCEs in each resource set, with resource sets having a same number of CCEs being ranked according to CCE index. Additionally, it is assumed in a certain embodiment that an 8-CCE common search space has been reserved for common control information (e.g., a common DCI message), which occupies CCE indexes 0-7.

FIG. 3 illustrates that the first (top) ranked DCI message is assumed to have a required minimum aggregation level 3 (e.g., a minimum of 4-CCEs required for resource allocation) including two allowable resource sets: a first ranked resource set consisting of 4-CCEs that begins at CCE index 8 and a second ranked resource consisting of 4-CCEs set that begins at CCE index 12. For the first ranked DCI message, two additional allowable resource sets are shown as available for allocation for aggregation level 4: a third ranked resource set consisting of 8-CCEs that begins at CCE index 16 and a fourth ranked resource set consisting of 8-CCEs that begins at CCE index 24. FIG. 3 illustrates that resources 302 for the first ranked DCI message have been previously allocated (e.g., using embodiments of PDCCH resource allocation described herein) at CCE indexes 8-11.

Further shown in FIG. 3, the second ranked DCI message is assumed to have a required minimum aggregation level 3 (e.g., a minimum of 4-CCEs required for resource allocation) including two allowable resource sets: a first ranked resource set consisting of 4-CCEs that begins at CCE index 12 and a second ranked resource set consisting of 4-CCEs that begins at CCE index 16. Since the first ranked DCI message and the second ranked DCI message have the same minimum number of required CCEs needed for their corresponding DCI messages, it is assumed that a first UE, which is to receive the first ranked DCI message has a higher UE identity (e.g., RNTI) as compared to a second UE that is to receive the second ranked DCI message; thus, the first ranked DCI message is ranked higher than the second ranked DCI message in the current example. Note the second ranked DCI message can also include additional allowable resource sets available for allocation, though these are not shown in FIG. 3 for purposes of illustrating other features of communication system 100. FIG. 3 illustrates that resources 304 for the second ranked DCI message have been previously allocated (e.g., using embodiments of PDCCH resource allocation described herein) at CCE indexes 12-15.

As noted for the present example, the third ranked DCI message is the current DCI message for which PDCCH resource allocation is needed. The third ranked DCI message is assumed to have a required minimum aggregation level 2 (e.g., a minimum of 2-CCEs required for resource allocation), including six allowable resource sets: a first ranked 2-CCE resource set that begins at CCE index 0, a second ranked set that begins at CCE index 2, a third ranked set that begins at CCE index 4, a fourth ranked set that begins at CCE index 6, a ranked fifth set that begins at CCE index 8, and a sixth ranked set that begins at CCE index 10.

In a certain embodiment, LTE radio 114, via resource allocation module 140, can begin to attempt to allocate PDCCH resource for the third ranked DCI message beginning with the first ranked allowable resource set (e.g., beginning at CCE index 0); however, as noted for the present example, the first eight CCEs have been previously allocated as a common search space. Thus, LTE radio 114, upon recursively checking availability of the first four ranked allowable resource sets in which the third DCI message can be allocated, can determine that each resource set is blocked by the CCEs allocated to the common search space.

Upon reaching the fifth ranked resource set (e.g., beginning at CCE index 8), LTE radio 114 can determine that the fifth ranked resource set is fully blocked by the first ranked DCI message and further that the sixth ranked resource set is also blocked by the first ranked DCI message. It should be noted that the third ranked DCI message can also include additional allowable resource sets available for allocation, though these are not shown in FIG. 3 and it is assumed, for the present example that each of these additionally ranked allowable resource sets are also blocked by the first DCI message, the second DCI message and/or the common search space.

Upon determining that all the ranked allowable resource sets for the third ranked DCI message are blocked, LTE radio 114 can attempt to re-allocate DCI messages, which are directly collided with the third ranked DCI message using two-layer searching. Note although the present example is described with reference to two-layer searching, the searching could be extended to include three-layer searching if collisions could not be avoided through two-layer searching.

In various embodiments, a basis at which to attempt the re-allocation of directly collided DCI messages can be set to begin attempt re-allocation for resource sets starting with the lowest-ranked resource set for which a collision occurs. In the present example, the lowest ranked resource set for which a collision occurs for the third ranked DCI is the fourth ranked resource set, which begins at CCE index 8, and is blocked by resources 302 previously allocated for the first ranked DCI message. Accordingly, LTE radio 114 can attempt to re-allocate resources 302 to another ranked allowable resource set for the first ranked DCI.

In attempting to re-allocate resources 302 from the first ranked resource set to the second ranked resource set for the first ranked DCI message, LTE radio 114 can determine that the re-allocation will cause resources 302 to be collided with resources 304 previously allocated for the second ranked DCI message. LTE radio 114 can determine, however, that resources 302 can be allocated to the third ranked resource set for the first ranked DCI message consisting of 8-CCEs that begins at CCE index 16 and which is not collided with resources 304 previously allocated for the second ranked DCI message nor the CCEs allocated to the common search space. Following the re-allocation, LTE radio 114 can verify whether the fifth ranked resource set for the third ranked DCI message is still collided with the first ranked DCI message.

In the present example, the fifth ranked resource set for the third ranked DCI message would not still be collided with the first ranked DCI message following the re-allocation and LTE radio 114 can allocate resources 306 for the third ranked DCI message to its fifth ranked resource set as shown in the possible composite PDCCH resource allocation for all the DCI messages following the two layer searching. The possible composite PDCCH resource allocation illustrates resources 306 for the third ranked DCI message allocated at CCE indexes 8-9; resources 304 for the second ranked DCI message allocated at CCE indexes 12-15; and resources 302 for the first ranked DCI message allocated at CCE indexes 16-23. Accordingly, embodiments of communication system 100 can provide for collision-avoided PDCCH resource allocation using the ranking and layer searching techniques described herein.

Figure 4:
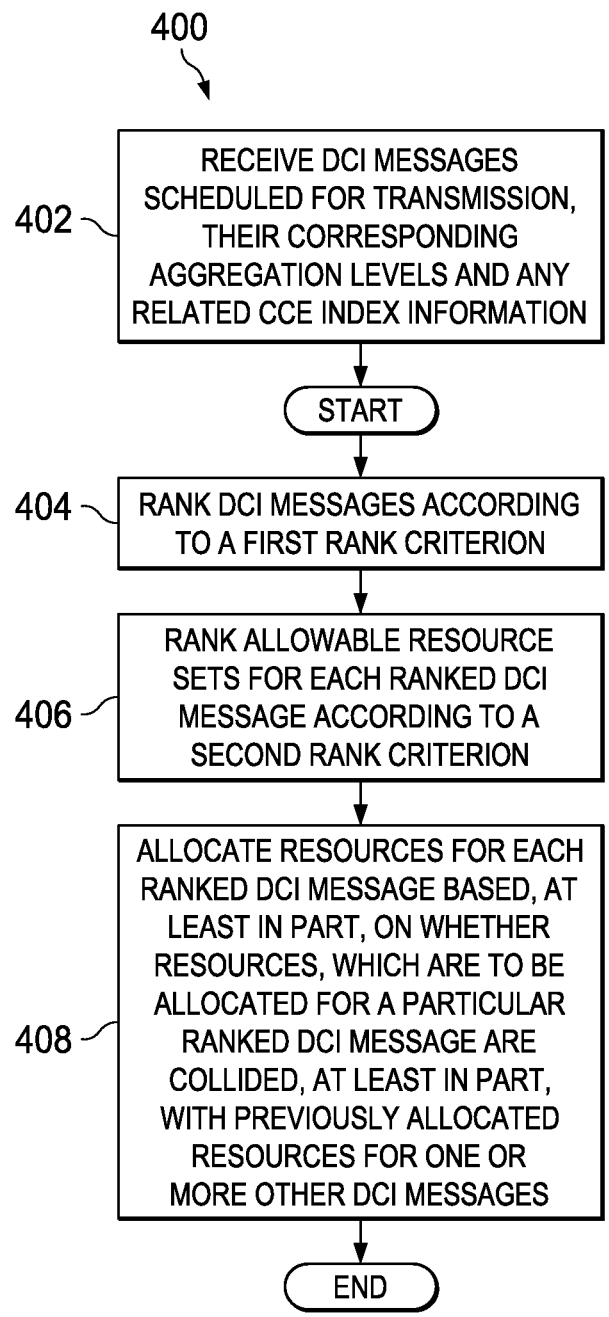
FIG. 4 is simplified flow diagram illustrating example operations associated with providing collision avoided PDCCH resource allocation in a network environment in accordance with one potential embodiment of the communication system.

Referring to FIG. 4, FIG. 4 is simplified flow diagram illustrating example operations 400 associated with providing collision-avoided PDCCH resource allocation in a network environment in accordance with one potential embodiment of communication system 100. In various embodiments, the operations can be performed by LTE radio 114 via resource allocation module 140. At any time, resource allocation module 140 may receive a number of DCI messages scheduled for transmission, their corresponding aggregation levels and any related CCE index information (e.g., starting index for UE specific search spaces for various aggregation levels, etc.), as shown at 402. In various embodiments, LTE radio 114 and/or resource allocation module 140 can receive the DCI messages, corresponding aggregation levels and any related CCE index information from other processes or operations being performed within or for LTE radio 114. Note a discussion of the processes, operations, etc. for preparing/scheduling DCI messages for transmission, determining corresponding minimum aggregation levels and determining CCE index information is outside the scope of the collision-avoided PDCCH resource allocation operations discussed herein.

Thus, processing for providing collision-avoided PDCCH resource allocation can begin at 404, in which the operations can rank DCI messages scheduled for transmission according to a first rank criterion. In various embodiments, the first rank criterion can include one or more of the following: ranking DCIs in descending order of the minimum number of CCEs that a DCI is allowed to use; for DCIs with same value of minimum number of CCEs, the DCIs may be ranked according to UE identity (e.g., UE identity to which a DCI corresponds) or may be ranked randomly.

At 406, the operations can rank the allowable resource sets for each ranked DCI message according to a second rank criterion. In certain embodiments, the operations can determine the allowable resource sets for each DCI message based on the minimum aggregation level for each DCI message. In certain embodiments, the operations can determine all allowable resource sets each ranked DCI message not only for the minimum aggregation level but also any higher aggregation level(s), to which resources can be allocated (e.g., using a mapping similar to that as shown in TABLE 1). In various embodiments, the second rank criterion can include one or more of the following: ranking resource sets in ascending order based on the number of CCEs required in each resource set that can be allocated for a given DCI message; for resource sets with same number of CCEs, these resource sets can be ranked according to the index of the starting CCE for each resource set or can be ranked randomly.

At 408, the operations can allocate resources for each ranked DCI message based, at least in part on, whether resources, which are to be allocated for a particular ranked DCI message are collided, at least in part, with previously allocated resources for one or more other DCI messages. In various embodiments, the allocating can include: determining whether the particular resources that are to be allocated for the particular ranked DCI message, are collided, at least in part, with any previously allocated resources for any of the one or more other DCI messages; and attempting to allocate the particular resources for the particular ranked DCI message within a particular ranked allowable resource set that is not collided with any previously allocated resources for any of the one or more other DCI messages. In various embodiments, the allocating can include performing N-layer resource set searching to allocate resources for the particular DCI message, which avoids collisions with other DCI messages having previously allocated resources using the method described herein in this Specification.

Figure 5A:
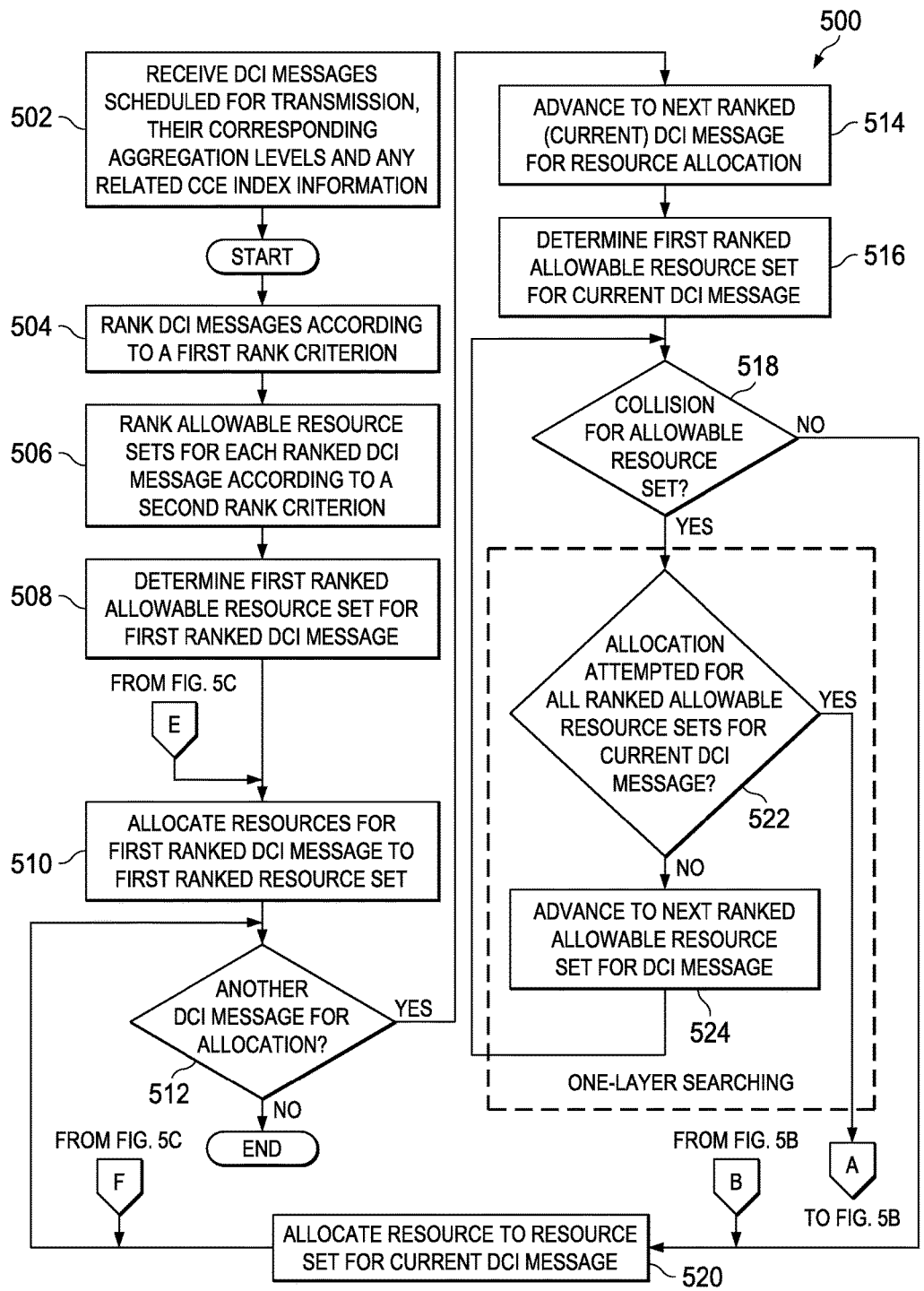
FIGS. 5A-5C are simplified flow diagrams illustrating other example operations associated with providing collision avoided PDCCH resource allocation in a network environment in accordance with one potential embodiment of the communication system.
Figure 5B:
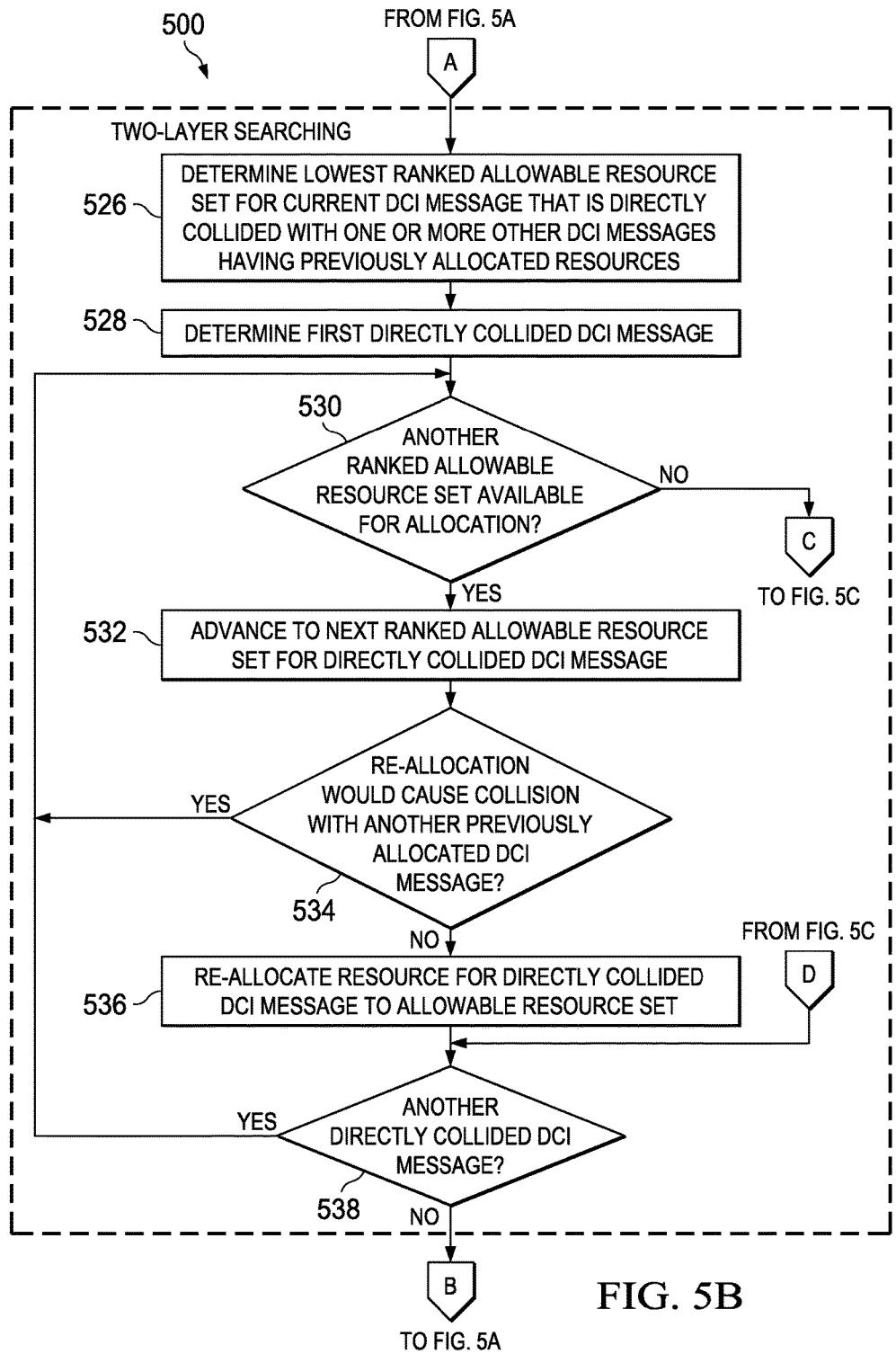
Figure 5C:
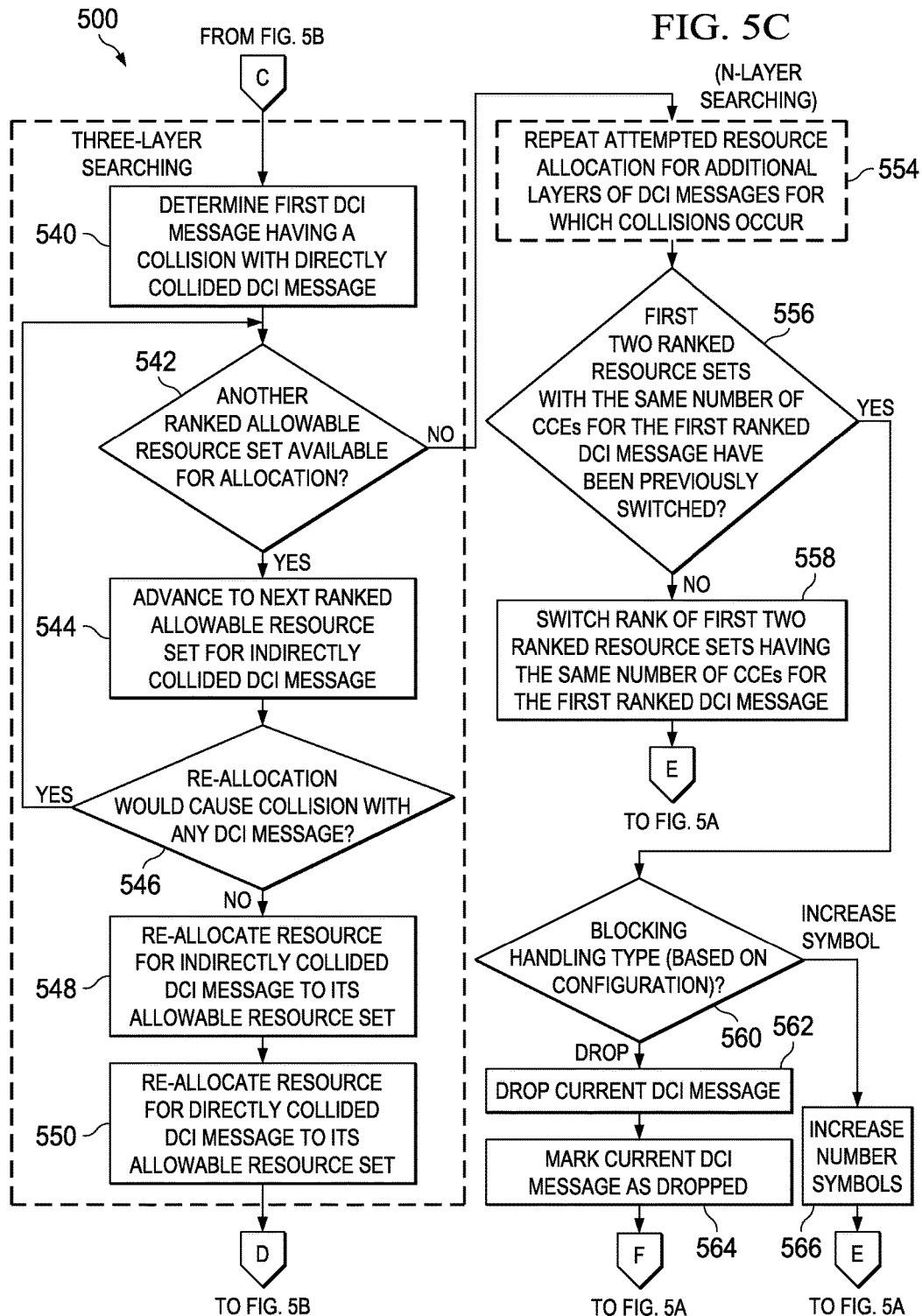

Referring to FIGS. 5A-5C, FIGS. 5A-5C are simplified flow diagrams illustrating other example operations 500 associated with providing collision-avoided PDCCH resource allocation in a network environment in accordance with one potential embodiment of the communication system. In various embodiments, the operations can be performed by LTE radio 114 via resource allocation module 140. For FIG. 5A operations performed at 502, 504 and 506 may correspond to the operations as described for FIG. 4 at 402, 404 and 406.

At 508, the operations can determine a first ranked allowable resource set for a first ranked DCI message and at 510, resources for the first ranked DCI message can be allocated to the first ranked resource set. At 512, a determination can be made as to whether resources for another DCI message are to be allocated. If not, the operations may end. Otherwise, if resources for another DCI message need to be allocated, the operations can advance to the next ranked DCI message (referred to as the 'current' DCI message for the remainder of the operations described in FIG. 5) for PDCCH resource allocation at 514 and can determine a first ranked allowable resource set for the current DCI message at 516.

At 518, the operations can determine whether a collision exists for the ranked allowable resource set (e.g., the first ranked allowable resource set at this point in the operations) for the current DCI message with one or more other DCI messages having previously allocated resources. If no collision exists for the ranked allowable resource set for current DCI message, resources for the current DCI message can be allocated to the ranked resource set at 520 and it can be determined whether resources for another DCI message need to be allocated (operations return to 512).

However, if a collision is found at 518, it can be determined at 522 if allocation has been attempted for all ranked allowable resource sets for the current DCI message. If not, the operations can advance to the next ranked allowable resource set for the current DCI message at 524 and again determine if a collision exists for the (next) ranked allowable resource set (return to 518). Resource allocations for the current DCI message can be attempted in this cyclical manner until a determination is made at 522 that all allocations have been attempted for all the ranked allowable resource sets for the current DCI message, in which case the operations can continue to 526 to attempt to re-allocate resources for any directly collided DCI messages having previously allocated resources using the two-layer searching operations illustrated in FIG. 5B.

At 526, the operations can determine the lowest ranked resource set for the current DCI message that is directly collided with one or more other DCI messages having previously allocated resources and at 528 can determine a first directly collided DCI message for which to begin the two-layer searching. At 530, it can be determined whether another ranked allowable resource set for the directly collided DCI message is available for re-allocation of the DCI message's resources. If so, resource allocation module 140 can advance to the next ranked allowable resource set for the directly collided DCI message at 532 and, at 534, can determine if re-allocation of the directly collided DCI message's resources to this ranked allowable resource set would cause a collision with previously allocated resources for another DCI message. If it is determined at 534 that a collision would occur with previously allocated resources for another DCI message (e.g., an indirectly collided DCI message), the operations can return to 530 where it can again be determined if still another ranked allowable resource set for the directly collided DCI message is available for re-allocation of the DCI message's resources. For repeated collisions with other previously allocated resources of other DCI messages (e.g., indirect collisions), the operations can continue in this cyclical manner until re-allocation has been attempted for all allowable resource sets for the directly collided DCI message.

If it is determined at 530, after attempted re-allocation of all allowable resource sets for the directly collided DCI message, that no other allowable resource set is available for re-allocation due to collisions with other DCI messages, the operations can continue to 540 for three-layer searching operations as shown in FIG. 5C.

However, if it is determined at 534 for any ranked allowable resource set that the resources for the directly collided DCI message would not cause a collision with another previously allocated DCI message, the resource can be re-allocated for the directly collided DCI message to the ranked allowable resource set at 536. At 538, it can be determined if another DCI message having previously allocated resources is still directly collided with the current DCI message. If not, the resources for the current DCI message can be allocated at the ranked allowable resource set for which the previous collision occurred (operations return to 520) and the processing can continue to check for additional DCI messages which may still need PDCCH resource allocation at 512. However, if it is determined that another directly collided DCI message exists at 538, operations can return to 530 to attempt to re-allocate resources for the additional directly collided DCI message using the operations as described at 530-536. The operations may repeat in this manner until all directly collided DCI message re-allocations have been resolved.

At 540, after attempting resource re-allocations for all allowable resource sets for a given DCI message as discussed above for operations 530-534, the operations can determine a first DCI message having a collision with a first attempted re-allocation of a directly collided DCI message (e.g., determine a first indirectly collided DCI message). By 'first attempted re-allocation' it is meant that the first attempted re-allocation of the directly collided DCI message which caused a collision with the indirectly collided DCI message. Recall, the PDCCH resource allocation operations are attempting to avoid collisions for the current DCI message for which allocation is sought. Thus, it is assumed at 540 that the attempted re-allocation of resources of the directly collided DCI message would 'free-up' certain CCE indexes that would allow the resources for the current DCI message to be allocated therein. In various embodiments, an indirectly collided DCI message may itself not be directly collided with the current DCI message.

The resource set searching for indirectly collided DCI messages can be performed in a similar manner as the resource set searching for directly collided DCI messages. In essence, the resource set searching for indirectly collided DCI message operates to re-allocate resources for indirectly collided DCI messages in attempts to avoid collisions with directly allocated DCI messages; thus allowing the resources to be allocated for the current DCI message for which allocation is sought.

Accordingly, at 542, the operations can determine whether another ranked allowable resource set is available for re-allocation of the indirectly collided DCI message's resources. If so, the operations can advance to the next ranked allowable resource set for the indirectly collided DCI message and, at 546, it can be determined if the re-allocation of the indirectly collided DCI message's resources to the next available resource set would cause a collision with any previously allocated DCI message. If not, resources for the indirectly collided DCI message can be allocated to its available allowable resource set at 548 and, at 550, resources for the directly collided DCI message can be re-allocated to the resource set which caused the collision with the indirectly collided DCI message. The operations can return to 538 to check for any additional directly collided DCI messages. If there are no additional directly collided DCI messages, the operations can return to 520 in which the resources for the current DCI message can be allocated at the ranked allowable resource set for which the previous collision occurred with the directly collided DCI message and the processing can continue to check for additional DCI messages which may still need PDCCH resource allocation at 512.

If it is determined at 542, however, that no other ranked allowable resource set is available for re-allocation of the resources for the indirectly collided DCI message, the operations can continue to 556 in which it can be determined whether the order of the first two ranked resource sets having the same number of CCEs for the first ranked DCI message have previously been switched. If not, the operations can switch the rank of the first two resource sets having the same number of CCEs for the first ranked DCI message at 558 and the operations may return to 510 in which the PDCCH resource allocation operations may essentially re-start to allocate resources for the first ranked DCI message again and then cycle through the remaining ranked DCI messages to attempt to allocate resources for each DCI message to avoid collisions between the messages.

In certain embodiments, prior to performing the switching the rank for the first two CCEs as described at 556, the operations can, depending on configuration, continue to search additional layers of any other DCI messages to resolve collisions for indirectly collided DCI messages and any other layers of indirectly collided DCI messages in attempts to re-allocate resources for previously allocated messages as shown at 554 in order to allocate resources for the current DCI message.

Returning to 556, if it is determined that the first two ranked resource sets with the same number of CCEs for the first ranked DCI message have previously been switched, the operations can continue to 560 in which the operations can determine whether a blocking handling type is set to a 'drop' handling type or is set to an 'increase symbol' handling type for when blocking may still occur. In various embodiments, the blocking handling type can indicate at least one of dropping the current DCI message from being allocated or increasing the number of symbols for the PDCCH region of the subframe. In various embodiments, LTE radio 114 and/or resource allocation module 140 can be configured by an operator, equipment manufacturer, vendor, etc. to set the blocking handling type. If a 'drop' handling type is determined at 560, based on configuration, the operations can continue to 562 in which the current DCI message can be dropped from the PDCCH resource allocation operations. At 564, the operations can mark the current DCI message as dropped and the operations can return to 512 to determine if there are any additional DCI messages for which allocation is needed.

If, however, an 'increase symbol' handling type is determined at 562, based on configuration, the operations can continue to 566 in which the number of symbols for the PDCCH region of the subframe can be increased (e.g., from three symbols to four symbols) and the operations can return to 510 in which the PDCCH resource allocation can re-start for the ranked DCI messages beginning with the first ranked DCI message. Thus, as shown in FIGS. 5A-5C, embodiments of communication system 100 can provide collision-avoided PDCCH resource allocation using various operations.

Turning to FIG. 6, FIG. 6 is a simulation graph illustrating simulation results 600 associated with example PDCCH resource allocation simulations using embodiments of the present disclosure. The simulation results 600 illustrate simulated blocking rates for 16 DCI messages to be allocated in each subframe based on one-layer searching operations, two-layer searching operations and three-layer searching operations using embodiments described herein across various cell-edge signal-to-interference-plus-noise ratios (SINRs) [expressed in decibels (dB)], which represent various channel conditions that can exist within a cell (e.g., within RAN 120).

In various embodiments, the simulation setup and/or assumptions can include: an NS3-based LTE multi-input multi-output (MIMO) fading channel model having an (extended pedestrian A) EPA-3 km/h fading profile; interference is additive white Gaussian noise (AWGN) and 100 UEs are randomly distributed within a cell and the worst SINR is limited by cell-edge SINR, which is considered to be a variable in the simulations; three symbols for PDCCH region including 42 CCEs for PDCCH resource allocation assuming a 10 MHz bandwidth and three symbols in each subframe for the PDCCH region and Ng for PHICH is 1/2, however, there is assumed to be an 8-CCE DCI message in the common search space so the number of CCEs available for PDCCH resource allocation in each subframe is reduced to 34 CCEs; transmission mode is set to mode 2 (e.g., 2 downlink transmission antennas at the LTE radio and 2 receiving antennas for each UE); a random RNTI is set for each UE with one DCI message per UE; random DCI formats are selected for each transmission time interval (TTI) with the DCI formats considered including [0, 1, 1A, 1B, 1D, 2, 2A and 2B]; uplink and downlink control traffic ratio is for transmission assumed to be 1:1; assume ideal PDCCH link adaptation for simplicity (e.g., ideal channel and noise estimation in channel quality indicator (CQI) reporting and the data subcarrier has the same power as the cell specific reference signal (CSRS) (e.g., rhoA=rhoB=1).

As illustrated in FIG. 6, for one-layer searching using embodiments of the present disclosure, the simulated blocking rate is at approximately 10% across SINRs from −8 dB (e.g., worst channel conditions) to 2 dB (e.g., near ideal channel conditions). Thus, approximately 1.6 DCI messages [note fractional DCI messages are considered for numerical analysis/simulation purposes only] may be blocked for each subframe when attempting to provide PDCCH resource allocation using only one-layer searching. It is assumed that actual cell-edge SINR in real-world deployments typically range from approximately −5 dB to approximately −2 dB.

For two-layer searching using embodiments of the present disclosure, the simulated blocking rate drops to less than 10% to approximately 0.01% from −8 dB to 2 dB, with a simulated blocking rate at less than 1% at −5 dB and dropping to less than 0.1% at −2 dB. For three-layer searching using embodiments of the present disclosure, the simulated blocking rate drops even more ranging from approximately 1% at −8 dB to approximately 0.01% at 2 dB, with a blocking rate of less than 1% at −5 dB and dropping to approximately 0.01% at −2 dB. Thus, two-layer searching and three-layer searching for collision-avoided PDCCH resource allocation using embodiments described herein have been shown to provide improvements in blocking rate (e.g., lower blocking rates) over one-layer searching alone.

Turning to FIG. 7, FIG. 7 is a simulation graph illustrating simulation results 700 associated with example PDCCH resource allocation simulations using embodiments of the present disclosure. The simulation results 600 illustrate simulated blocking rates using the three-layer collision-avoided PDCCH resource allocation embodiments described herein for 16 DCI messages, 20 DCI messages and 24 DCI messages to be allocated in each subframe across various cell-edge SINRs, which represent various channel conditions that can exist within a cell (e.g., within RAN 120). The simulation setup and/or assumptions made for the example PDCCH resource allocation simulations as described for FIG. 6 were also made for the example PDCCH resource allocation simulations for FIG. 7.

As shown in FIG. 7, the simulated blocking rates for 16 DCIs to be scheduled in each sub-frame using three-layer searching embodiments described herein are shown to range from approximately 1% at −8 dB to approximately 0.01% at 2 dB (similar to the results shown in FIG. 6). The simulated blocking rates for 20 DCIs to be allocated in each subframe using three-layer searching embodiments described herein are shown to range from less than 10% at −8 dB (nearer to 1%) to approximately 0.1% at 2 dB. The simulated blocking rates for 24 DCIs to be scheduled in each subframe using three-layer searching embodiments described herein are shown to range from less than 10% at −8 dB to approximately 1% at 2 dB. Accordingly, collision-avoided PDCCH resource allocation using the three-layer searching embodiments described herein in various embodiments can be used to allocate 16 or more DCIs in each subframe for various channel conditions. In various embodiments, allocating 16 or more DCIs in each subframe can be used in small cell deployments in which the number of users can be densely located near each small cell radio in the system.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method comprising:
ranking a plurality of downlink control information (DCI) messages according to a first rank criterion;
ranking a plurality of allowable resource sets for each ranked DCI message according to a second rank criterion, wherein ranking according to the second rank criterion further comprises at least one of:
ranking, for each ranked DCI message, allowable resource sets for a particular ranked DCI message in ascending order according to a number of control channel elements (CCEs) required in each allowable resource set for the particular ranked DCI message; and for any corresponding allowable resource sets for the particular ranked DCI message having a same number of control channel elements (CCEs): ranking the corresponding allowable resource sets according to an index of a starting CCE for each corresponding allowable resource set or ranking the corresponding allowable resource sets randomly; and allocating resources for each ranked DCI message based, at least in part, on whether particular resources, which are to be allocated for a particular ranked DCI message, are collided, at least in part, with previously allocated resources for one or more other DCI messages.

2. The method of claim 1, wherein the allocating further comprises:

determining whether the particular resources that are to be allocated for the particular ranked DCI message, are collided, at least in part, with any previously allocated resources for any of the one or more other DCI messages; and attempting to allocate the particular resources for the particular ranked DCI message to a particular ranked allowable resource set that is not collided with any previously allocated resources for any of the one or more other DCI messages.

3. The method of claim 2, further comprising:

determining that all ranked allowable resource sets for the particular ranked DCI message are collided with one or more other ranked DCI messages having previously allocated resources;

determining a lowest ranked allowable resource set for the particular ranked DCI message that is directly collided with one or more other ranked DCI messages having previously allocated resources; and attempting to re-allocate resources for each corresponding directly collided ranked DCI message to another of its corresponding ranked allowable resource set to avoid collisions with the particular ranked allowable resource set for the particular ranked DCI message and with any other ranked DCI messages having previously allocated resources.

4. The method of claim 3, further comprising:

determining that an attempted re-allocation of a directly collided DCI message causes another collision with one or more other DCI messages having previously allocated resources; and attempting to re-allocate resources for any of the one or more other ranked DCI messages to another ranked allowable resource set that is not collided with either the particular resource set for the particular ranked DCI message or the directly collided DCI message.

5. The method of claim 4, further comprising:

determining that no re-allocation of any DCI message having previously allocated resources is possible without causing additional collisions; and performing at least one of:

switching a ranking for a first two ranked allowable resource sets allowable resource sets having a same number of control channel elements (CCEs) for a first ranked DCI message and attempting to allocate resources for each ranked DCI message to avoid collisions among the ranked DCI messages; and increasing a number of symbols in a control region for a subframe in which the plurality of ranked DCI messages are to be allocated.

6. The method of claim 1, wherein the one or more other DCI messages for which resources have previously been allocated include at least one of:

one or more other ranked DCI messages; and one or more DCI messages allocated to a common search space of a physical downlink control channel (PDCCH) region of a subframe.

7. The method of claim 1, wherein ranking according to the first rank criterion further comprises at least one of:

ranking the plurality of DCI messages in descending order according to a minimum number of control channel elements (CCEs) that each of a given DCI message is allowed to use; and for any corresponding DCI messages having a same minimum number of CCEs: ranking the corresponding DCI messages according to user equipment identities associated with the corresponding DCI messages or ranking the corresponding DCI messages randomly.

8. One or more non-transitory tangible media encoding logic that includes instructions for execution by a processor, wherein the execution causes the processor to perform operations, comprising:

ranking a plurality of downlink control information (DCI) messages according to a first rank criterion;

ranking a plurality of allowable resource sets for each ranked DCI message according to a second rank criterion, wherein ranking according to the second rank criterion further comprises at least one of:

ranking, for each ranked DCI message, allowable resource sets for a particular ranked DCI message in ascending order according to a number of control channel elements (CCEs) required in each allowable resource set for the particular ranked DCI message; and for any corresponding allowable resource sets for the particular ranked DCI message having a same number of control channel elements (CCEs): ranking the corresponding allowable resource sets according to an index of a starting CCE for each corresponding allowable resource set or ranking the corresponding allowable resource sets randomly; and allocating resources for each ranked DCI message based, at least in part, on whether particular resources, which are to be allocated for a particular ranked DCI message, are collided, at least in part, with previously allocated resources for one or more other DCI messages.

9. The media of claim 8, wherein the allocating further comprises:

determining whether the particular resources that are to be allocated for the particular ranked DCI message, are collided, at least in part, with any previously allocated resources for any of the one or more other DCI messages; and attempting to allocate the particular resources for the particular ranked DCI message to a particular ranked allowable resource set that is not collided with any previously allocated resources for any of the one or more other DCI messages.

10. The media of claim 9, wherein the execution causes the processor to perform further operations, comprising:

determining that all ranked allowable resource sets for the particular ranked DCI message are collided with one or more other ranked DCI messages having previously allocated resources;

determining a lowest ranked allowable resource set for the particular ranked DCI message that is directly collided with one or more other ranked DCI messages having previously allocated resources; and attempting to re-allocate resources for each corresponding directly collided ranked DCI message to another of its corresponding ranked allowable resource set to avoid collisions with the particular ranked allowable resource set for the particular ranked DCI message and with any other ranked DCI messages having previously allocated resources.

11. The media of claim 10, wherein the execution causes the processor to perform further operations, comprising:

determining that an attempted re-allocation of a directly collided DCI message causes another collision with one or more other DCI messages having previously allocated resources; and attempting to re-allocate resources for any of the one or more other ranked DCI messages to another ranked allowable resource set that is not collided with either the particular resource set for the particular ranked DCI message or the directly collided DCI message.

12. The media of claim 11, wherein the execution causes the processor to perform further operations, comprising:

determining that no re-allocation of any DCI message having previously allocated resources is possible without causing additional collisions; and performing at least one of:

switching a ranking for a first two ranked allowable resource sets allowable resource sets having a same number of control channel elements (CCEs) for a first ranked DCI message and attempting to allocate resources for each ranked DCI message to avoid collisions among the ranked DCI messages; and increasing a number of symbols in a control region for a subframe in which the plurality of ranked DCI messages are to be allocated.

13. The media of claim 8, wherein ranking according to the first rank criterion further comprises at least one of:

ranking the plurality of DCI messages in descending order according to a minimum number of control channel elements (CCEs) that each of a given DCI message is allowed to use; and for any corresponding DCI messages having a same minimum number of CCEs: ranking the corresponding DCI messages according to user equipment identities associated with the corresponding DCI messages or ranking the corresponding DCI messages randomly.

14. An apparatus, comprising:

a memory element for storing data; and a processor for executing instructions associated with the data, wherein the executing causes the apparatus to perform operations, comprising:

ranking a plurality of downlink control information (DCI) messages according to a first rank criterion;

ranking a plurality of allowable resource sets for each ranked DCI message according to a second rank criterion, wherein ranking according to the second rank criterion further comprises at least one of:

ranking, for each ranked DCI message, allowable resource sets for a particular ranked DCI message in ascending order according to a number of control channel elements (CCEs) required in each allowable resource set for the particular ranked DCI message; and for any corresponding allowable resource sets for the particular ranked DCI message having a same number of control channel elements (CCEs): ranking the corresponding allowable resource sets according to an index of a starting CCE for each corresponding allowable resource set or ranking the corresponding allowable resource sets randomly; and allocating resources for each ranked DCI message based, at least in part, on whether particular resources, which are to be allocated for a particular ranked DCI message, are collided, at least in part, with previously allocated resources for one or more other DCI messages.

15. The apparatus of claim 14, wherein the allocating further comprises:

determining whether the particular resources that are to be allocated for the particular ranked DCI message, are collided, at least in part, with any previously allocated resources for any of the one or more other DCI messages; and attempting to allocate the particular resources for the particular ranked DCI message to a particular ranked allowable resource set that is not collided with any previously allocated resources for any of the one or more other DCI messages.

16. The apparatus of claim 15, wherein the executing causes the apparatus to perform further operations, comprising:

determining that all ranked allowable resource sets for the particular ranked DCI message are collided with one or more other ranked DCI messages having previously allocated resources;

determining a lowest ranked allowable resource set for the particular ranked DCI message that is directly collided with one or more other ranked DCI messages having previously allocated resources; and attempting to re-allocate resources for each corresponding directly collided ranked DCI message to another of its corresponding ranked allowable resource set to avoid collisions with the particular ranked allowable resource set for the particular ranked DCI message and with any other ranked DCI messages having previously allocated resources.

17. The apparatus of claim 16, wherein the executing causes the apparatus to perform further operations, comprising:

determining that an attempted re-allocation of a directly collided DCI message causes another collision with one or more other DCI messages having previously allocated resources; and attempting to re-allocate resources for any of the one or more other ranked DCI messages to another ranked allowable resource set that is not collided with either the particular resource set for the particular ranked DCI message or the directly collided DCI message.

18. The apparatus of claim 17, wherein the executing causes the apparatus to perform further operations, comprising:

determining that no re-allocation of any DCI message having previously allocated resources is possible without causing additional collisions; and performing at least one of:

switching a ranking for a first two ranked allowable resource sets allowable resource sets having a same number of control channel elements (CCEs) for a first ranked DCI message and attempting to allocate resources for each ranked DCI message to avoid collisions among the ranked DCI messages; and increasing a number of symbols in a control region for a subframe in which the plurality of ranked DCI messages are to be allocated.

19. The apparatus of claim 14, wherein the one or more other DCI messages for which resources have previously been allocated include at least one of:

one or more other ranked DCI messages; and one or more DCI messages allocated to a common search space of a physical downlink control channel (PDCCH) region of a subframe.

20. The apparatus of claim 14, wherein ranking according to the first rank criterion further comprises at least one of:

ranking the plurality of DCI messages in descending order according to a minimum number of control channel elements (CCEs) that each of a given DCI message is allowed to use; and for any corresponding DCI messages having a same minimum number of CCEs: ranking the corresponding DCI messages according to user equipment identities associated with the corresponding DCI messages or ranking the corresponding DCI messages randomly.

* * * * *